US008132862B2

(12) United States Patent
Yamada et al.

(10) Patent No.: US 8,132,862 B2
(45) Date of Patent: Mar. 13, 2012

(54) SEAT BACK FRAME FOR VEHICLE

(75) Inventors: Yukifumi Yamada, Toyota (JP); Naoki Goto, Tokai (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 127 days.

(21) Appl. No.: 12/694,816

(22) Filed: Jan. 27, 2010

(65) Prior Publication Data
US 2010/0187893 A1   Jul. 29, 2010

(30) Foreign Application Priority Data

Jan. 29, 2009 (JP) ................................. 2009-018391
Jan. 29, 2009 (JP) ................................. 2009-018450

(51) Int. Cl.
*B60N 2/42* (2006.01)
*A47C 7/02* (2006.01)
*A47C 7/42* (2006.01)

(52) U.S. Cl. ........... 297/452.2; 297/452.18; 297/216.13; 297/248

(58) Field of Classification Search ............ 297/216.13, 297/248, 452.18, 452.2
See application file for complete search history.

(56) References Cited

U.S. PATENT DOCUMENTS

| | | | | |
|---|---|---|---|---|
| 4,192,545 A | * | 3/1980 | Higuchi et al. | 297/216.13 |
| 4,804,226 A | * | 2/1989 | Schmale | 297/216.13 |
| 4,993,778 A | * | 2/1991 | Colin et al. | 297/452.2 |
| 5,246,271 A | * | 9/1993 | Boisset | 297/452.2 X |
| 5,310,247 A | * | 5/1994 | Fujimori et al. | 297/452.18 X |
| 5,362,132 A | * | 11/1994 | Griswold et al. | 297/452.2 X |
| 5,452,941 A | * | 9/1995 | Halse et al. | 297/452.2 X |
| 5,501,509 A | * | 3/1996 | Urrutia | 297/452.18 |
| 5,564,785 A | * | 10/1996 | Schultz et al. | 297/452.2 |
| 5,645,316 A | | 7/1997 | Aufrere et al. | |
| 5,681,081 A | * | 10/1997 | Lindner et al. | 297/216.13 |
| 5,685,614 A | * | 11/1997 | Chabanne | 297/452.2 |
| 5,697,670 A | * | 12/1997 | Husted et al. | 297/216.13 |

(Continued)

FOREIGN PATENT DOCUMENTS

DE           199 59 075 A1      6/2001

(Continued)

OTHER PUBLICATIONS

*Extended Search Report issued May 4, 2010 by the European Patent Office in European Patent Application No. 10152154.0.

*Primary Examiner* — Rodney B White
(74) *Attorney, Agent, or Firm* — Buchanan Ingersoll & Rooney PC

(57) ABSTRACT

A seat back frame for a vehicle for supporting a seat back, includes a first back frame, at which a shoulder belt anchor for supporting one end portion of a seat belt is provided, a second back frame arranged substantially in parallel with the first back frame, and a cross member connecting the first back frame and the second back frame, wherein a protruding portion or a recessed portion is formed at the cross member so as to extend in a longitudinal direction thereof, a first recessed surface portion or a first protruding surface portion is formed at the first back frame and a second recessed surface portion or a second protruding surface portion is formed at the second back frame so that the first back frame and the second back frame are fittedly connected to the protruding portion or the recessed portion of the cross member.

9 Claims, 14 Drawing Sheets

U.S. PATENT DOCUMENTS

| | | | |
|---|---|---|---|
| 6,045,186 A * | 4/2000 | Butt et al. | 297/216.13 X |
| 6,082,823 A * | 7/2000 | Aumont et al. | 297/452.2 |
| 6,241,318 B1 * | 6/2001 | Amano | 297/452.2 |
| 6,347,836 B1 | 2/2002 | Hayotte | |
| 6,352,311 B1 | 3/2002 | Hayotte | |
| 6,375,267 B1 * | 4/2002 | Ishikawa | 297/452.18 |
| 6,585,325 B1 * | 7/2003 | Pal | 297/452.2 X |
| 6,666,520 B2 * | 12/2003 | Murphy et al. | 297/216.13 X |
| 6,817,672 B2 * | 11/2004 | Matsunuma | 297/452.18 |
| 6,869,145 B2 * | 3/2005 | Matsunuma | 297/452.18 |
| 7,093,901 B2 * | 8/2006 | Yamada | 297/452.2 X |
| 7,201,447 B2 * | 4/2007 | Yamada | 297/216.13 X |
| 7,261,373 B2 * | 8/2007 | Tanaka et al. | 297/216.13 |
| 7,510,245 B2 * | 3/2009 | Okazaki et al. | 297/452.18 X |
| 7,597,395 B2 * | 10/2009 | Wiedeman et al. | 297/248 |
| 7,604,081 B2 * | 10/2009 | Ootani et al. | 297/216.13 X |
| 7,748,779 B2 * | 7/2010 | Zimmerman et al. | 297/216.13 |
| 7,887,139 B2 * | 2/2011 | Yamada et al. | 297/452.18 |
| 2005/0168041 A1 * | 8/2005 | Glance et al. | 297/452.18 |
| 2005/0225133 A1 | 10/2005 | Aufrere et al. | |
| 2008/0164732 A1 | 7/2008 | Valasin et al. | |
| 2008/0277993 A1 | 11/2008 | Blankart | |
| 2010/0187886 A1 * | 7/2010 | Yamada et al. | 297/452.2 X |

FOREIGN PATENT DOCUMENTS

| | | |
|---|---|---|
| DE | 100 48 128 A1 | 4/2002 |
| DE | 10 2004 048 351 A1 | 4/2006 |
| DE | 10 2006 004 531 B3 | 8/2007 |
| DE | 10 2006 007 140 A1 | 8/2007 |
| EP | 1 647 442 A2 | 4/2006 |
| FR | 2 736 312 A1 | 1/1997 |
| FR | 2 786 743 A1 | 6/2000 |
| FR | 2 793 745 A1 | 11/2000 |
| JP | 2005-67331 A | 3/2005 |
| JP | 2005-297960 A | 10/2005 |

\* cited by examiner

Detailed diagram of portion IIIB

Detailed diagram of portion IVB

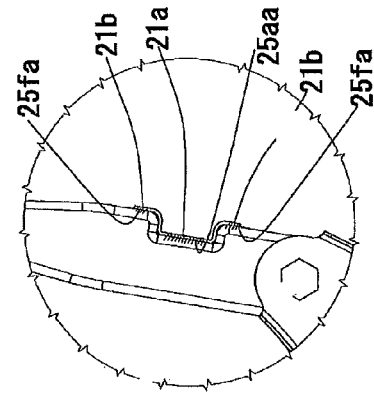
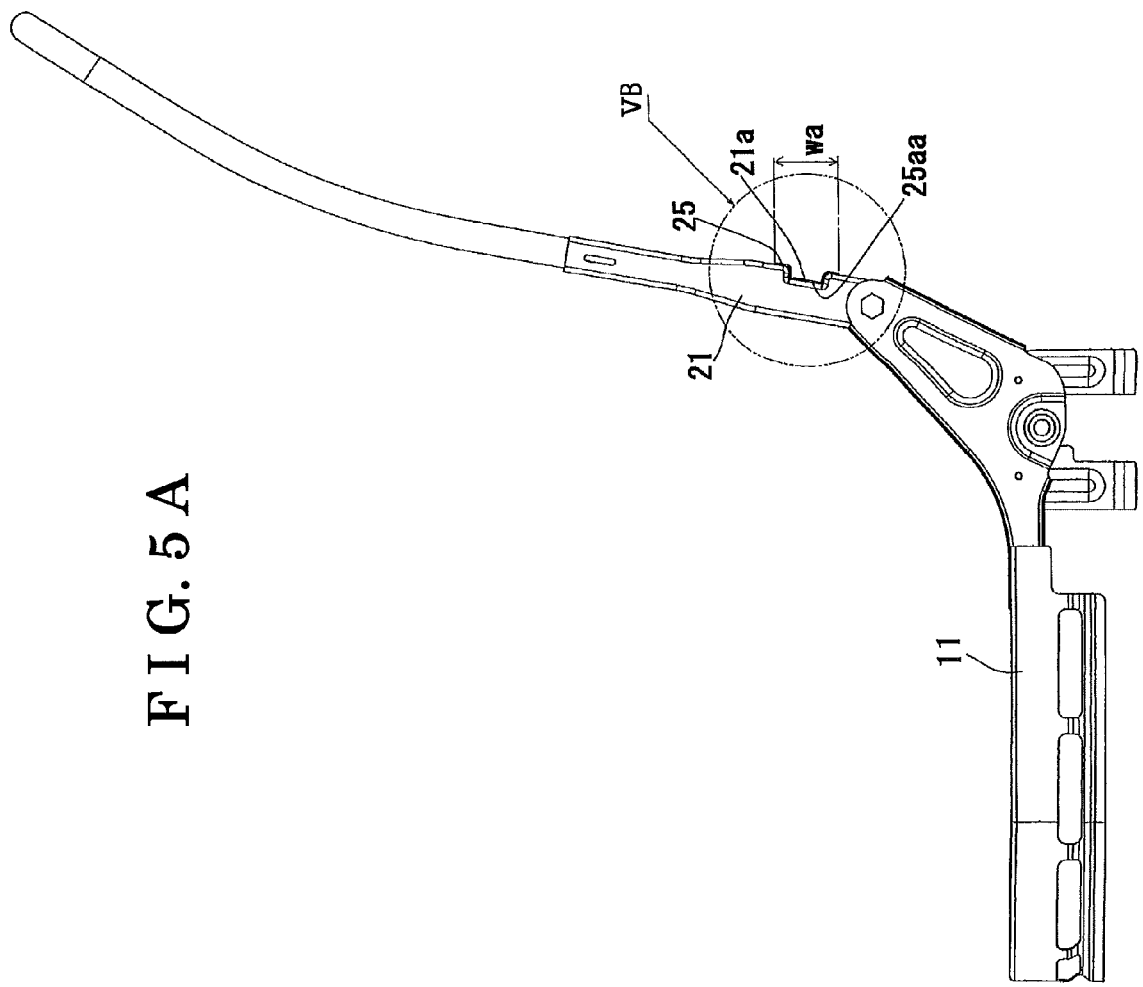
FIG. 5A
FIG. 5B
Detailed diagram of portion VB

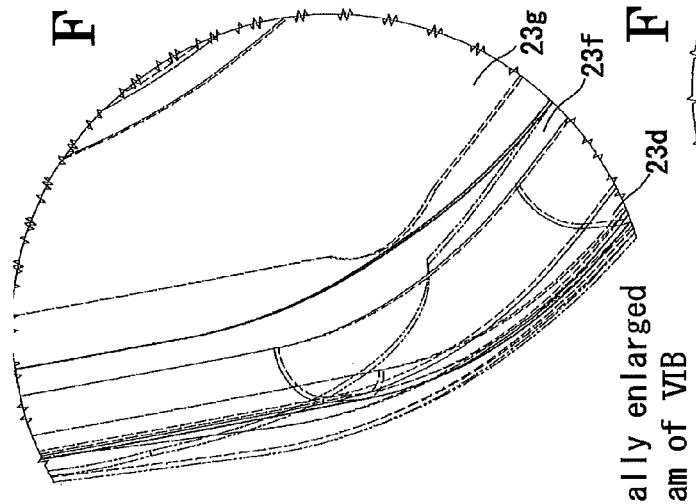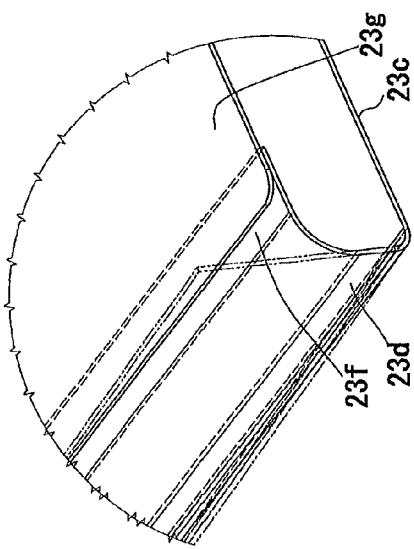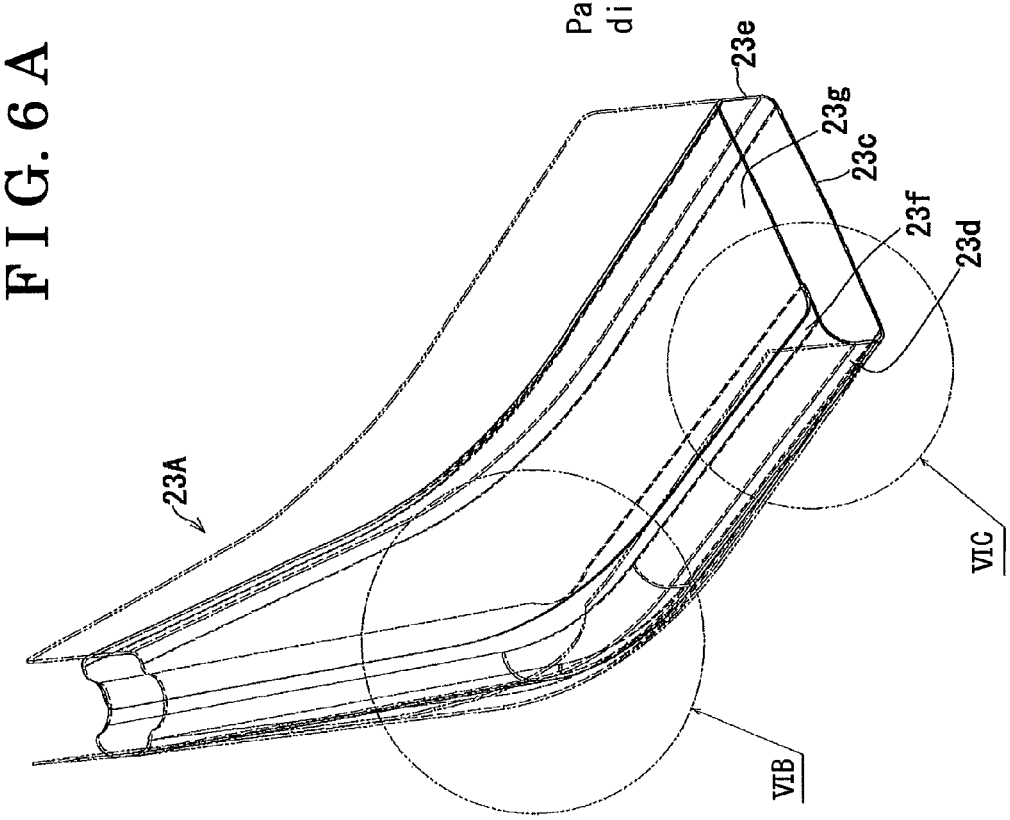
FIG. 6B
FIG. 6C
Partially enlarged diagram of VIC
FIG. 6A
Partially enlarged diagram of VIB Partially enlarged diagram of VIIIB E view Partially enlarged diagram of IXB Partially enlarged diagram of XB G view Partially enlarged diagram of XIB H view

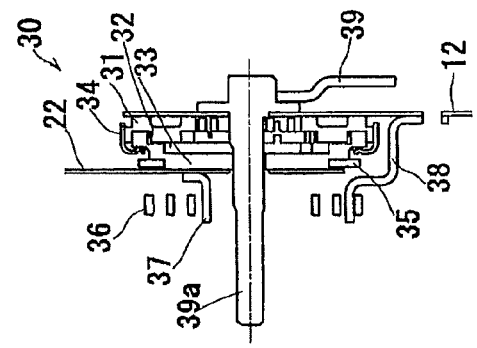
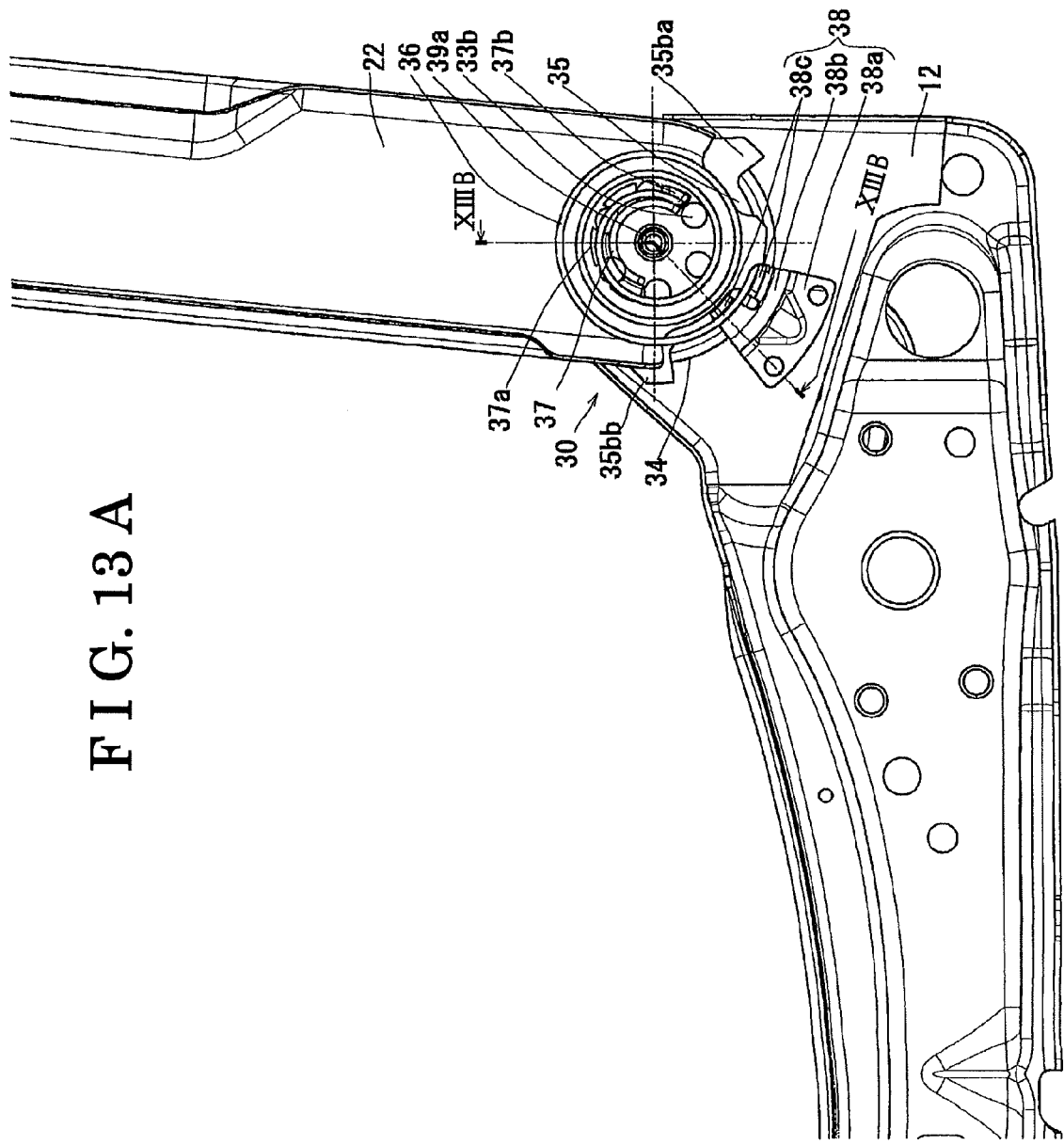

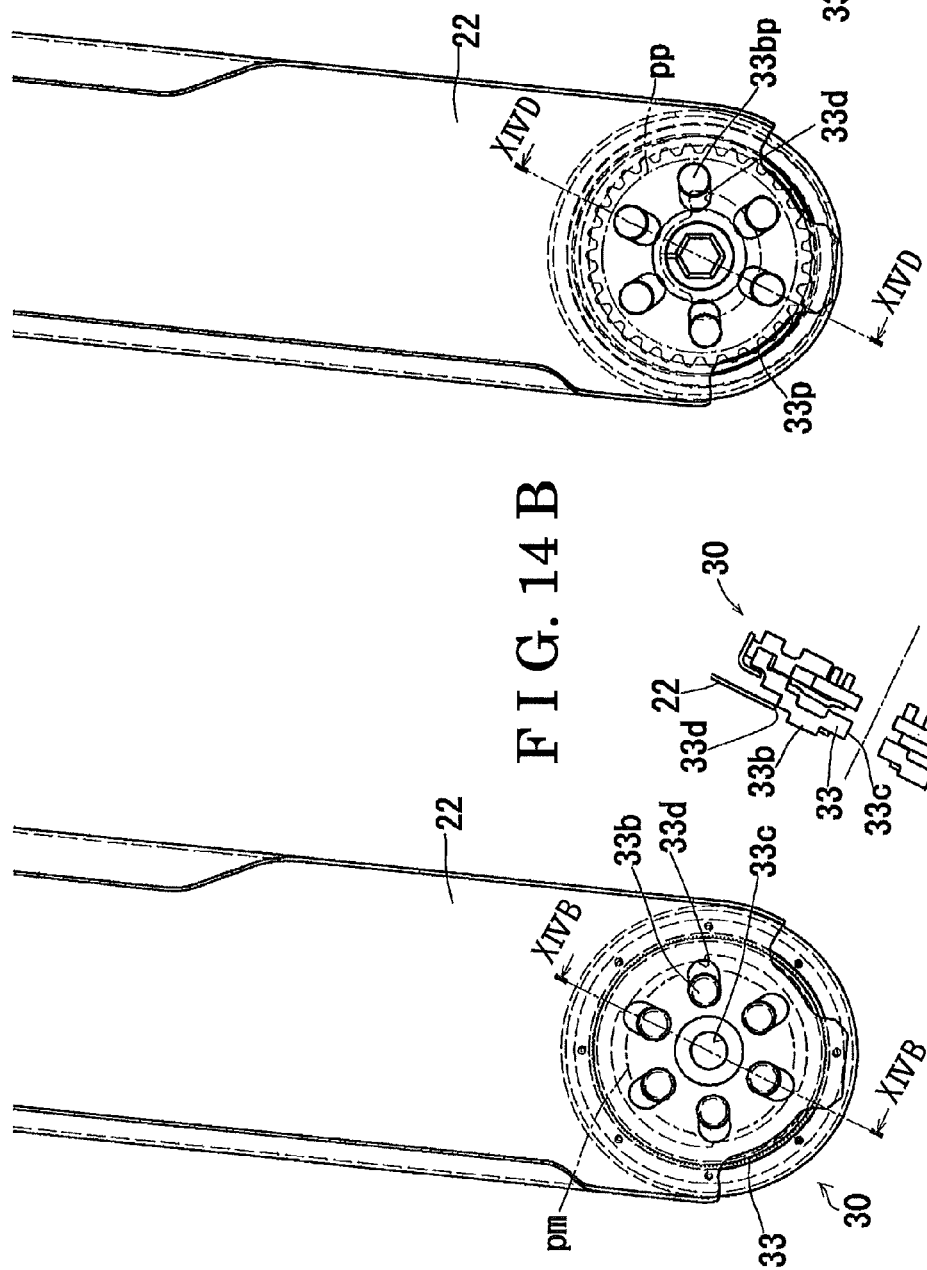

SEAT BACK FRAME FOR VEHICLE

CROSS REFERENCE TO RELATED APPLICATIONS

This application is based on and claims priority under 35 U.S.C. §119 to Japanese Patent Application 2009-018391, filed on Jan. 29, 2009, and Japanese Patent Application 2009-018450, filed on Jan. 29, 2009, the entire contents of which are incorporated herein by reference.

TECHNICAL FIELD

This disclosure generally relates to a seat back frame for a vehicle. More specifically, this disclosure pertains to a seat back frame for a vehicle having a first back frame, which includes a shoulder belt anchor for supporting one end portion of a seat belt, and a second back frame, which is arranged so as to be in substantially parallel with the first back frame.

BACKGROUND

Disclosed in JP2005-297960A is a seat cushion frame for a vehicle having a left and right cushion side frames (i.e. first and second back frames). JP2005-297960A states that the left and right cushion side frames are adaptable as left and right back-side frames, respectively. Accordingly, the seat cushion frame for the vehicle according to JP2005-297960 will be explained below with the left and right back-side frames. Each of the left and right back-side frames has a shape, which is obtained by bending both end portions of a plate member in order to form two boxes. Furthermore, a recessed portion is formed between two boxes of each of the left and right back-side frames. The both end portions of the plate member of each of the left and right back-side frames are connected to the main body thereof at which the recessed portion is formed in a state where the end portions of the plate member face each other in order to enhance a strength of the seat back frame for the vehicle.

Disclosed in JP2005-67331A is a seat back frame for a vehicle having right and left back-side frames (first and second back frames), an upper cross member for connecting the right and left back-side frames at upper portions thereof and a lower cross member for connecting the right and left back-side frames at lower portions thereof. Each of the right and left back-side frames is formed in a box shape. Each of the upper cross member and the lower cross member is formed in a tubular shape. The lower cross member is connected to the right and left back-side frames by welding in a state where both end portions of the lower cross member are inserted into holes formed at right and left back-side frames, respectively, in order to ensure a strength at the seat back frame for the vehicle.

Disclosed in DE10048128A1 is a seat back frame for a vehicle having right and left back-side frames, an upper cross member for connecting the right and left side frames at upper portions thereof and a lower cross member for connecting the right and left side frames at lower portions thereof. Each of the right and left back-side frames is obtained by bending both end portions of a plate member into substantially cylinder shapes. Furthermore, the upper cross member is formed in a tubular shape. The lower cross member is formed in a bar shape. The right and left back-side frames are arranged so that plate surfaces thereof face each other. Furthermore, both end portions of each of plural lower cross members are connected to circumferential surfaces of cylindrical-shaped portions of the right and left back-side frames positioned at a back-side in front-rear direction of the vehicle, respectively, in order to ensure a strength at the seat back frame for the vehicle.

Disclosed in DE102004048351A1 is a seat back frame for a vehicle formed as a unit. A portion of the seat back frame for the vehicle disclosed in DE10200404835A1 corresponding to the lower cross member is formed in a substantially flat surface shape in order to ensure a strength at the seat back frame for the vehicle.

Generally, in a case where a shoulder belt anchor for supporting one end portion of a seat belt is provided at an upper portion of the seat back frame for the vehicle, if the vehicle is involved in a crash, the seat belt is pulled forward by a great tensile force because of an inertia generated by an occupant, thereby applying a great load to the shoulder belt anchor. For example, the seat belt is arranged so as cross the passenger's body from the right shoulder to the left waist and then to the right waist. Therefore, in the case where the vehicle is involved in the crash, a diagonally forward left-torsional bending moment is generated at the seat back frame for the vehicle because of the above-mentioned load. A similar situation may occur at a seat for two people used as a back seat for the vehicle.

In a case where the configuration of the back-side frame of the seat back frame for the vehicle disclosed in JP2005-297860A is adapted as a center back-side frame, a compression deformation may occur at the center back-side frame with the recessed portion as a fiducial point when the torsional bending moment acts on the center back-side frame, because two box shaped portions are divided at the recessed portion, to which the end portions thereof are connected. On the other hand, in a case where the configuration of the back-side frame of the seat back frame for the vehicle disclosed in JP2005-67331A is adapted as the center back-side frame, a compression force acts on a front wall portion of the plate shaped member, which is bent to have a box shape and which is arranged at a front portion of the seat in the front-rear direction of the vehicle, because of the torsional bending moment. Therefore, a compression deformation may occur at a connected portion at the front wall portion because of the compression force acting on the front wall portion, at which end portions of both side end portions of the plate-shaped member bent to form a box is overlapped and connected.

According to the seat back frames disclosed in JP2005-297960A and JP2005-67331A, the center back-side frame may be formed to have a curved shape, so that a recessed portion is formed at a rear portion of the seat in order to provide a comportability for the occupants seated on the seat for two, furthermore, in order to simplify the configuration of the center back-frame.

In the case where the plate-shaped member of the center back-side frame having the configuration of the back-side frame disclosed in JP2005-297960A is formed to have a curved shape so that the recessed portion is formed at the rear portion of the seat, a tension acts on the side end portions of the plate-shaped member, which form the box-shaped portion at the rear portion of the seat. Therefore, flatness of the plate-shaped member may be achieved with accuracy, which may result in facilitating a connection between the recessed portion and the both end portions of the plate-shaped member. However, because the side end portions of the plate-shaped member forming the box-shaped portion are compressed when being processed, unevenness or crinkle is likely to generate on surfaces of the side end portions of the plate-shaped portion. Accordingly, the flatness of the side end portions of the plate-shaped member may not be obtained with high accuracy, which may result in causing a difficulty in connecting the end portions of the plate-shaped member with the recessed portion.

The lower cross member of the seat back frame for the vehicle according to JP2005-67331A may have a rigidity against the torsional bending moment because the lower cross member is formed in the tubular shape. However, the lower cross member and the back-side frame are connected in a manner where an outer circumferential surface of the tube-shaped member contacts an inner circumferential surface of a hole formed at the plate-shaped member, in other words, the lower cross member and the back-side frame are connected along a line (i.e. a connected line). Therefore, in a case where a tension is concentrated on the connected portion between the lower cross member and the back-side frame because of the torsional bending moment, a compression deformation may occur at the connected portion.

The lower cross member of the seat back frame for the vehicle according to DE10048128A1 is formed in the bar shape. Therefore, a rigidity of the lower cross member against the torsional bending member may be lower than the lower cross member formed in the tubular shape. However, because plural lower cross members are provided at the seat back frame for the vehicle disclosed in DE10048128A1, a load applied thereto may be dispersed. The back-side frame and each of the lower cross members are connected in a manner where an outer circumferential surface of the bar-shaped portion contacts an outer circumferential surface of the cylindrical member, in other words, the back-side frame and each of the lower cross members are connected along a line (i.e. a connected line). Therefore, in a case where a tension is concentrated on the connected portions between the lower cross members and the back-side frame because of the torsional bending moment, the connected portions may fracture. Furthermore, according to DE10200404835A1, because the seat back frame is formed as the unit, a load applied thereto may be dispersed. However, the portion corresponding to the lower cross member is formed in a substantially flat surface shape. Therefore, if the seat back frame for the vehicle is even slightly deformed, the seat back frame for the vehicle may be suddenly compressingly deformed.

A need thus exists to provide a seat back frame for a vehicle which is not susceptible to the drawback mentioned above.

SUMMARY

According to an aspect of this disclosure, a seat back frame for a vehicle for supporting a seat back, includes a first back frame, at which a shoulder belt anchor for supporting one end portion of a seat belt is provided, a second back frame arranged substantially in parallel with the first back frame, and a cross member arranged so as to connect the first back frame and the second back frame, wherein a protruding portion or a recessed portion is formed at the cross member so as to extend in a longitudinal direction thereof, a first recessed surface portion or a first protruding surface portion is formed at the first back frame so as to be fittedly connected to the protruding portion or the recessed portion of the cross member, and a second recessed surface portion or a second protruding surface portion is formed at the second back frame so as to be fittedly connected to the protruding portion or the recessed portion of the cross member.

BRIEF DESCRIPTION OF THE DRAWINGS

The foregoing and additional features and characteristics of this disclosure will become more apparent from the following detailed description considered with the reference to the accompanying drawings, wherein:

FIG. 5A is a side view illustrating a left back-side frame of the seat frame for the vehicle and surrounding components;

FIG. 5B is an enlarged detailed diagram of a portion VB indicated by a circle in FIG. 5A;

FIG. 6A is a perspective view of the center back-side frame of the seat frame for the vehicle;

FIG. 6B is a partially enlarged diagram of a portion VIB indicated by a circle in FIG. 6A;

FIG. 6C is a partially enlarged diagram of a portion VIC indicated by a circle in FIG. 6A;

FIG. 13A is an assembling diagram of the reclining apparatus illustrated in FIG. 12;

FIG. 13B is a cross-sectional diagram taken along line XIIIB-XIIIB in FIG. 13A;

FIG. 14A is a side view of a manual-type reclining apparatus;

FIG. 14B is a cross-sectional view taken along line XIVB-XIVB in FIG. 14A;

FIG. 14C is a side view of a power-type reclining apparatus; and

FIG. 14D is a cross-sectional view taken along line XIVD-XIVD in FIG. 14C.

DETAILED DESCRIPTION

Figure 1:
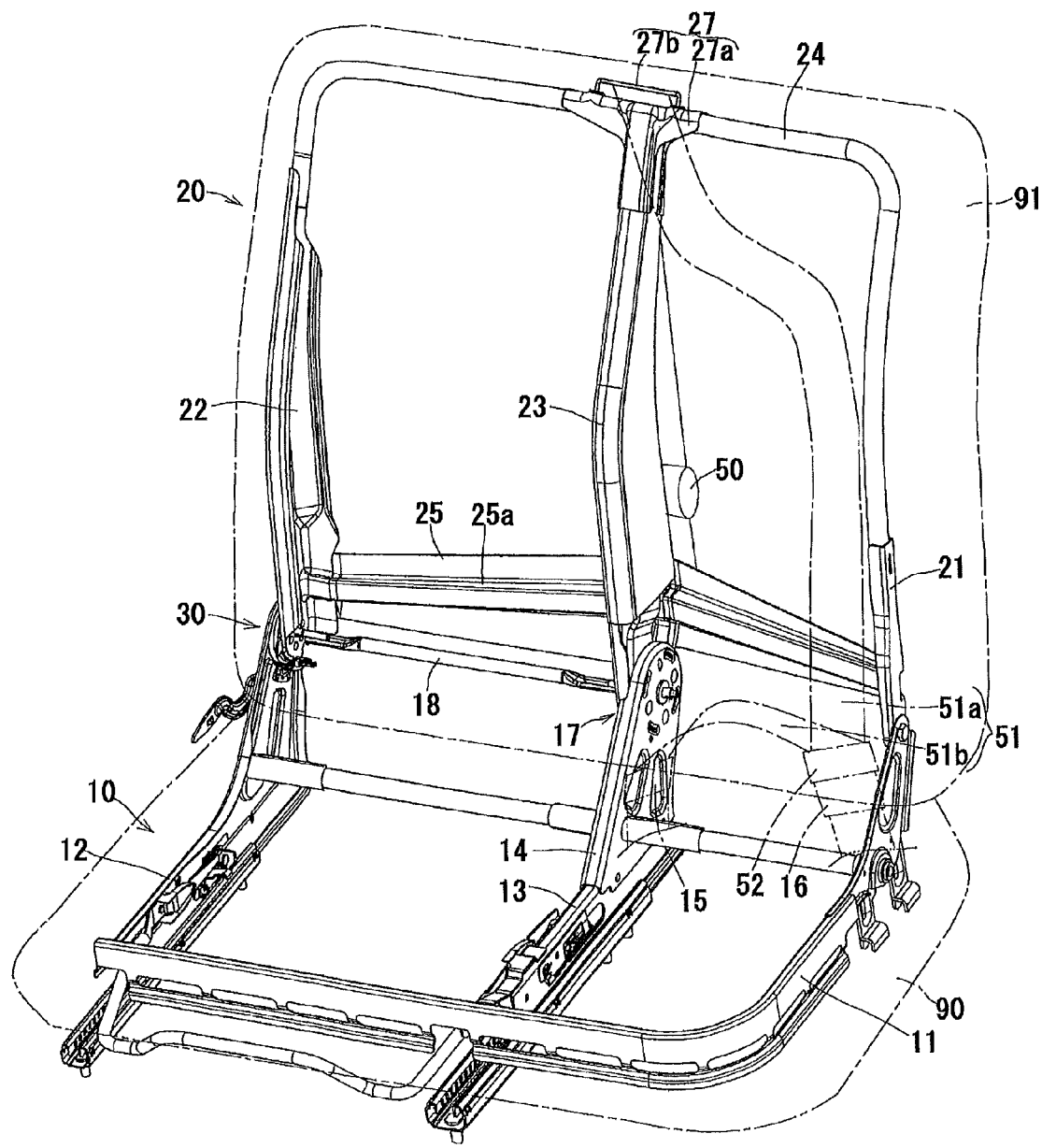
FIG. 1 is a perspective view illustrating a seat frame for a vehicle according to an embodiment.

An embodiment of a seat frame for a vehicle (which will be hereinafter referred to as a seat frame) having a seat back frame for the vehicle (which will be hereinafter referred to as a seat back frame) will be described below in accordance with the attached drawings. In this embodiment, "up (upward)", "down (downward)", "right" and "left" correspond to directions in reference to an occupant seated on a seat for the vehicle (which will be hereinafter referred to as a seat). As illustrated in FIG. 1, the seat frame includes a seat cushion frame 10 for supporting a seat cushion 90, a seat back frame 20 for supporting a seat back 91, a recliner 30 for rotatably connecting the seatback 91 relative to the seat cushion 90 and for adjusting a rotational angle of the seat back 91, and a shoulder belt anchor 27 provided at an upper end portion of the seat back frame 20. The shoulder belt anchor 27 includes a joint portion 27a and a belt guide portion 27b.

A left side back frame 21 (a second back frame) and a right side back frame 22 (the second back frame), each of which is formed so that a cross-sectional shape thereof is formed in a substantially bracket shape and is curved to form a recess at a rear portion of the seat, are arranged at left and right portions of the seat back frame 20, respectively. Furthermore, a center back frame 23 (a first back frame) is provided at a substantially intermediate portion of the seat back frame 20. The center back frame 23 is formed in a quadrangle-hollow-column shape and is curved so as to form a recess at the rear side of the seat. An upper end portion of the left side back frame 21 and an upper end portion of the right side back frame 22 are connected by means of an upper cross member 24. An upper end portion of the center back frame 23 is connected to an intermediate portion of the upper cross member 24 by means of the joint portion 27a. The joint portion 27a also protects a shoulder belt portion 51a. The belt guide portion 27b for guiding reel out and reel in of the shoulder belt portion 51a is provided at an upper portion of the joint portion 27a. A lower end portion of the left side back frame 21, a lower end portion of the center back frame 23 and a lower end portion of the right side back frame 22 are connected by means of a lower cross member 25 (i.e. a cross member).

A left cushion frame 11 and a right cushion frame 12 are provided at left and right portions of the seat cushion frame 10, respectively. Furthermore, a cushion center-frame 13 is provided at a substantially intermediate portion of the seat cushion frame 10. A bracket, which is made of a thick plate material, is provided at an upper portion of the cushion center-frame 13. The recliner 30 is provided at the right side back frame 22, so that the recliner 30 rotatably connects the seat cushion frame 10 and the seat back frame 20. The recliner 30 is connected to a recliner 17, which is provided at a portion between the center back frame 23 and the bracket 14 by means of a connecting shaft 18.

A retractor 50 is provided at the seat back frame 20, so that one end portion of a seat belt 51, which includes the shoulder belt portion 51a and a lap belt portion 51b, is reeled in by the retractor 50. The other end portion of the seat belt 51 is fixed at an anchor plate 15, which is attached at the cushion center-frame 13. The seat belt 51 is inserted into a tongue plate 52, so that the seat belt 51 engages with the tongue plate 51 at a substantially intermediate portion of the seat belt 51. The tongue plate 52 is detachably connected to a buckle 16, which is attached to the left cushion frame 11. Additionally, a portion of the seat belt 51 from the retractor 50 to the tongue plate 52 is referred to as the shoulder belt portion 51a. On the other hand, a portion of the seat belt 51 from the tongue plate 52 to the anchor plate 15 is referred to as the lap belt portion 51b.

Figure 2:
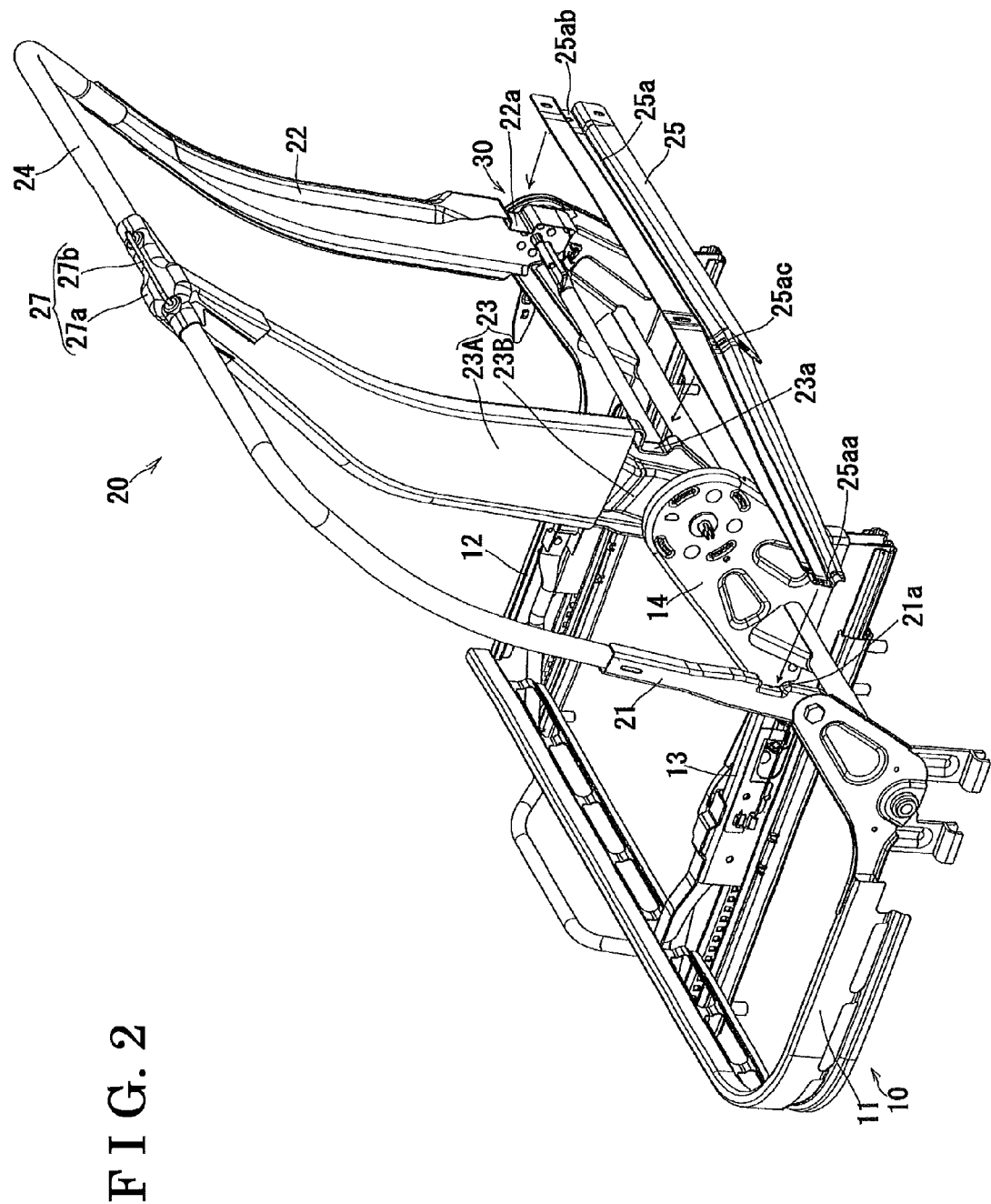
FIG. 2 is a perspective view of the seat frame for the vehicle, not including a lower cross member, being viewed from behind.

Detailed explanations about the left and right side back frames 21 and 22, the center back frame 23 and the lower cross member 25 will be given below with reference to FIGS. 1 to 5. As illustrated in FIGS. 1 and 2, the left side back frame 21, whose cross-section is formed in the substantially bracket shape, is arranged so that an opening portion thereof opens towards the right. Furthermore, the left side back frame 21 is bent to have a curved shape, so that the recess is formed at the rear portion of the seat. Similarly, the right side back frame 22, whose is formed in the substantially bracket shape, is arranged so that an opening portion thereof opens towards the left. Furthermore, the right side back frame 22 is bent to have a curved shape, so that the recess is formed at the rear portion of the seat. The seat back frame 20 is curved to have the recess at the rear portion of the seat so as to properly support the back of the occupant.

The center back frame 23 includes a closed section portion 23A at an upper portion thereof and an open section portion 23B at lower portion thereof. More specifically, a plate-shaped member is formed in the quadrangle-hollow-column shape and is curved to have the recess at the rear portion of the seat, thereby forming the closed section portion 23A at the upper portion of the plate-shaped member (i.e. the center back portion 23). Furthermore, a plate-shaped member is bent so that a cross-section thereof forms a substantially bracket shape, so that the plate-shaped member (i.e. the center back portion 23) is arranged in a manner where an opening portion thereof opens to the left, thereby forming the open section portion 23B at the lower portion of the center back portion 23. According to the center back portion 23 having the above-described configuration, the center back portion 23 ensures a rigidity because of the closed section portion 23A. On the other hand, weight of the center back portion 23 is reduced because of the open section portion 23B. Furthermore, a connection between the recliner 17 and the center back portion 23 may be facilitated.

The lower cross member 25 is made of a band-plate shaped member. Furthermore, the lower cross member 25 includes a protruding portion 25a so as to protrude forward in the front-rear direction of the vehicle and so as to extend in a longitudinal direction of the lower cross member 25. A left recessed surface portion 21a (a second recessed surface portion) is formed at a rear portion of the left side back frame 21. A left-end portion of the protruding portion 25a (which will be hereinafter referred to as a left-end protruding portion 25aa) formed at the lower cross member 25 is fitted into and connected to the left recessed surface portion 21a. Similarly, a right recessed surface portion 22a (the second recessed surface portion) is formed at a rear portion of the right side back frame 22. A right-end portion of the protruding portion 25a (which will be hereinafter referred to as a right-end protruding portion 25ab) is fitted into and connected to the right recessed surface portion 22a. A center recessed surface portion 23a (i.e. a first recessed surface portion) is formed at a rear portion of the open section surface portion 23B of the center back frame 23. A substantially intermediate portion of the protruding portion 25a (which will be hereinafter referred to as an intermediate protruding portion 25ac) is fitted into and connected to the center recessed surface portion 23a. Accordingly, the open section portion 23B of the center back frame 23 is reinforced by means of the lower cross member 25, thereby ensuring the rigidity of the seat back frame 20.

Figure 3B:
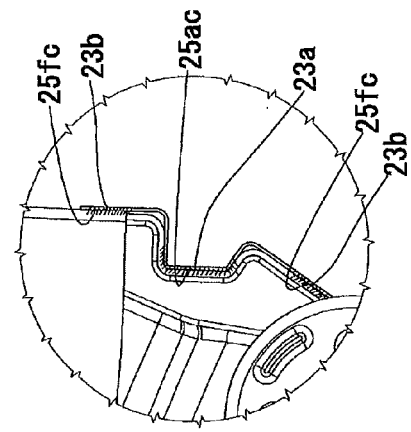
FIG. 3B is an enlarged detailed diagram of a portion 111B indicated by a circle in FIG. 3A.
Figure 3A:
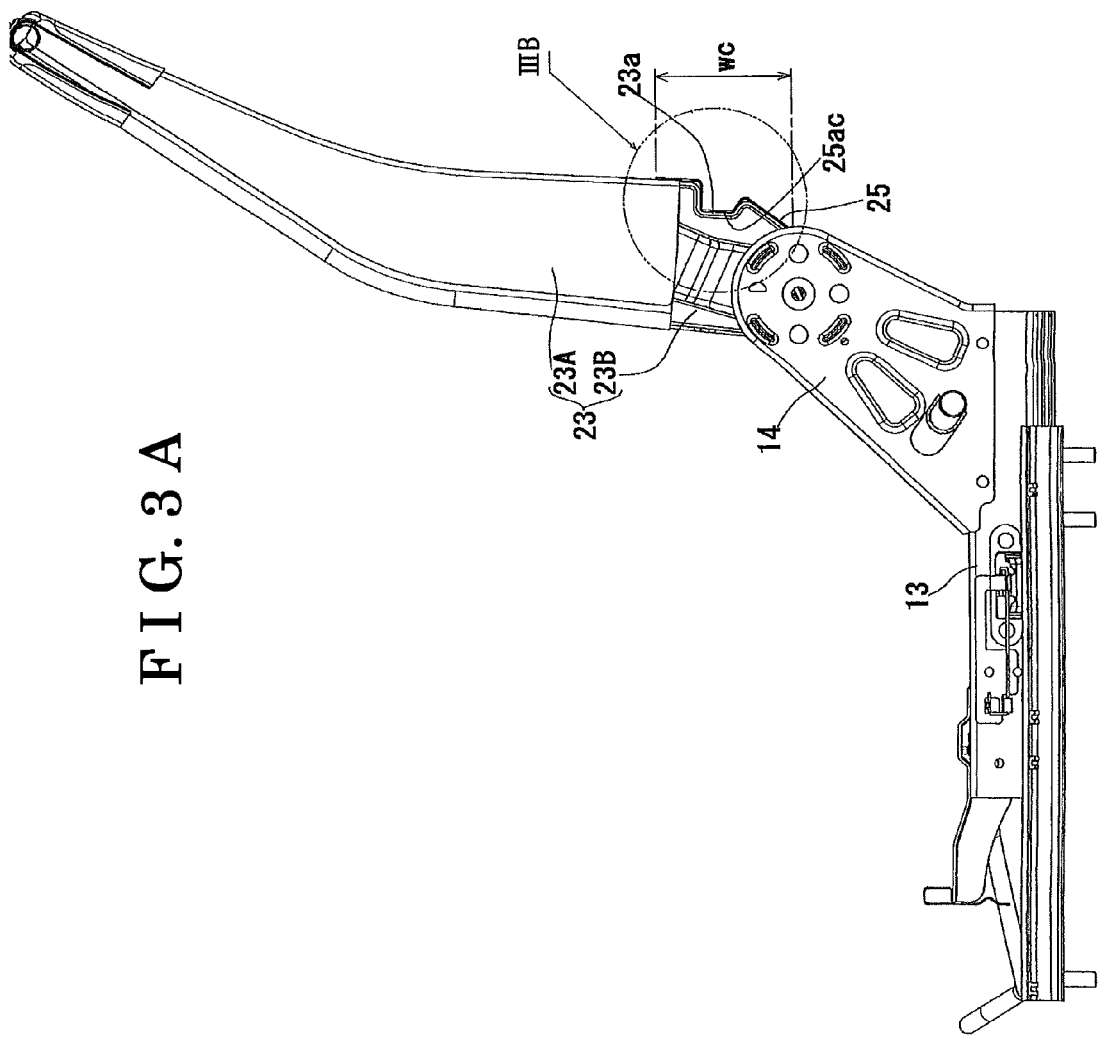
FIG. 3A is a side view illustrating a center back-side frame of the seat frame for the vehicle and surrounding components.
Figure 4A:
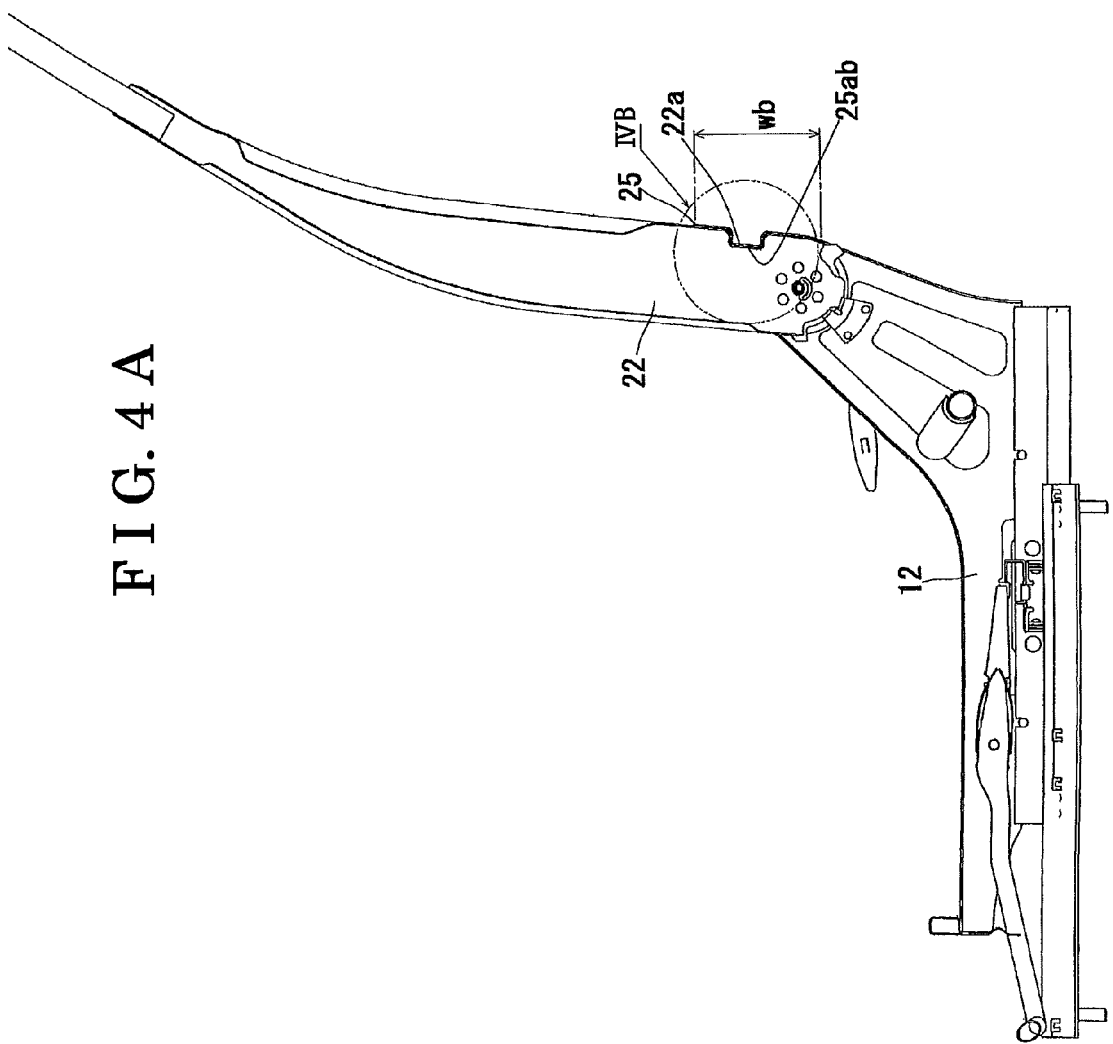
FIG. 4A is a side view illustrating a right back-side frame of the seat frame for the vehicle and surrounding components.
Figure 4B:
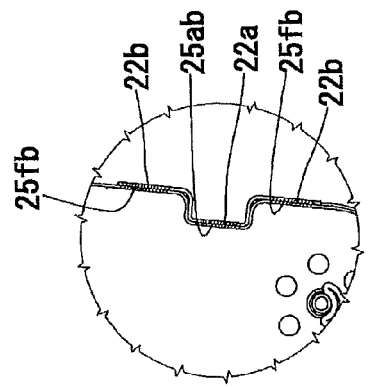
FIG. 4B is an enlarged detailed diagram of a portion IVB indicated by a circle in FIG. 4A.

As illustrated in FIGS. 3 to 5, the lower cross member 25 is formed so that a width wc at the intermediate protruding portion 25*ac*, which is connected to the center back frame 23, is formed to be the widest, a width wb at the right-end protruding portion 25*ab*, which is connected to the right side back frame 22, is formed to be narrower than the width wc, and a width wa at the left-end protruding portion 25*aa*, which is connected to the left side frame 21, is formed to be the narrowest. In other words, the lower cross member 25 is formed so that the width thereof linearly decreases from the intermediate protruding portion 25*ac* to the right-end protruding portion 25*ab*, and from the intermediate protruding portion 25*ac* to the left-end protruding portion 25*aa*, in other words, from the width wc to the width wb, and from width wc to the width wa.

A size (an area) of a cross-section of the recessed surface portion 23*a* of the center back frame 23 is formed to be the greatest when comparing to the right recessed surface portion 22*a* of the right side back frame 22 and the left recessed surface portion 21*a* of the left side back frame 21. A size (an area) of a cross-section of the right recessed surface portion 22*a* of the right side back frame 22 is set to be smaller than the recessed surface portion 23*a* of the center back frame 23 but to be greater than the left recessed surface portion 21*a* of the left side back frame 21. A size (an area) of a cross-section of the left recessed surface portion 21*a* of the left side back frame 21 is formed to be the smallest. The protruding portion 25*a* of the lower cross member 25 is formed so that a size (an area) of a cross-section of the intermediate protruding portion 25*ac* is formed to be the greatest so as to correspond to the size (the area) of the cross-section of the center recessed surface portion 23*a*, a size (an area) of the right-end protruding portion 25*ab* is formed to be smaller than the intermediate protruding portion 25*ac* but to be greater than the left-end protruding portion 25*aa* so as to correspond to the size (the area) of the left recessed surface portion 22*a*, and a size (an area) of the left-end protruding portion 25*aa* is formed to be the smallest so as to correspond to the size (the area) of the left recessed surface portion 21*a*.

As illustrated by oblique lines in a detailed diagram of a portion 111B in FIG. 3B, the center back frame 23 and the lower cross member 25 are connected to each other at a bottom portion of the center recessed surface portion 23*a* and surrounding portions on the one hand and a top portion of the intermediate protruding portion 25*ac* and surrounding portions on the other by welding and the like, and at a flat surface portion 23*b* in the vicinity of the center recessed surface portion 23*a* and a flat surface portion 25*fc* in the vicinity of the intermediate protruding portion 25*ac* by welding and the like. As illustrated by oblique lines in a detailed diagram of a portion IVB in FIG. 4B, the right side back frame 22 and the lower cross member 25 are connected to each other at a bottom portion and the right recessed surface portion 22*a* and surrounding portions on the one hand and a top portion of the right-end protruding portion 25*ab* and surrounding portions on the other by means of welding and the like, and at a flat surface portion 22*b* in the vicinity of the right recessed surface portion 22*a* and a flat surface portion 25*fb* in the vicinity of the right-end protruding portion 25*ab* by welding and the like. As illustrated by oblique lines in a detailed diagram of a portion VB in FIG. 5B, the left side back frame 21 and the lower cross member 25 are connected to each other at a bottom portion of the left recessed surface portion 21*a* and surrounding portions on the one hand and a top portion of the left-end protruding portion 25*aa* and surrounding portions on the other by welding and the like, and at a flat surface portion 21*b* in the vicinity of the left recessed surface portion 21*a* and a flat portion 25*fc* in the vicinity of the left-end protruding portion 25*aa* by welding and the like. Additionally, screw holes may be provided at the lower cross member 25, and screws may be provided at the left side back frame 21, the right side back frame 22 and the center back frame 23 in order to connect the left side back frame 21, the right side back frame 22 and the center back frame 23 with the lower cross member 25, instead of welding.

Accordingly, because the protruding portion 25*a* is formed at the lower cross member 25, the cross-section of the lower cross member 25 is formed to have an uneven shape (protrusions and recesses), the rigidity of the lower cross member 25 may be enhanced. Furthermore, the left and right side back frames 21 and 22 on the one hand and the lower cross member 25 on the other hand are connected with each other in a manner where the left and right recessed surface portions 21*a* and 22*a* contact the left-end and right-end protruding portions 25*aa* and 25*ab*, respectively (i.e. a surface connection). Similarly, the center back frame 23 and the lower cross member 25 are connected to each other in a manner where the center recessed surface portion 23*a* contacts the intermediate protruding portion 25*ac* (i.e. the surface connection). Therefore, connection strength at connected portions between the left and right side back frames 21 and 22 on the one hand and the lower cross member 25 on the other, and between the center back frame 23 and the lower cross member 25 may be enhanced.

In a case where the vehicle is involved in a crash, the seat belt 51 is pulled forward with a great tensile force because of an inertia of the occupant. As a result, a great load is applied to the shoulder belt anchor 27, which is provided at the center back frame 23, thereby generating a torsional bending moment at the seat back frame 20 because of the load. However, as described above, because the rigidity of the lower cross member 25 is enhanced, a compression deformation may be avoided from occurring at the lower cross member 25. Furthermore, because the connection strength between the center back frame 23, the left side back frame 21 and the right side back frame 22 on the one hand and the lower cross member 23 on the other is enhanced, the compression deformation or a fracture may be avoided from occurring at each connected portion.

The torsional bending moment, which is generated when the vehicle is involved in the crash, tends to become the maximum at the connected portion between the lower cross member 24 and the center back frame 23. Therefore, the compression deformation or the fracture is likely to occur at the connected portion between the lower cross member 25 and the center back frame 23 when the vehicle is involved in the crash. Therefore, the connected portion between the lower cross member 25 and the center back frame 23 needs to be formed to have a sufficient width to resist against the maximum torsional bending moment. However, if the lower cross member 25 is formed in a rectangle shape to have the sufficient width to resist against the maximum torsional bending moment, the lower cross member 25 is likely to be enlarged. However, according to the lower cross member 25 of the embodiment, the width wc at the connected portion between the center back frame 23 and the lower cross member 25 is formed to be wider than the width wa at the connected portion between the left side back frame 21 and the lower cross member 25 and the width wb at the connected portion between the right side back frame 22 and the lower cross member 25. Furthermore, the lower cross member 25 is formed so that the width thereof linearly decreases from the connected portion between the center back frame 23 and the lower cross member 25 towards the connected portions between the left and right side back frames 21 and 22 on the one hand and the lower cross member 25 on the other hand.

Therefore, the lower cross member 25 ensures a sufficient resistance against the torisonal bending moment, because the connected portion between the center back portion 23 and the lower cross member 25 is formed to have the sufficient width to resist against the maximum torsional bending moment, while the widths of the connected portions between the lower cross member 25 on the one hand and the left and right side back frames 21 and 22 are not unnecessarily enlarged. Accordingly, the lower cross member 25 may be reduced in size and weight.

Furthermore, in general, the intermediate protruding portion 25ac, which is fitted into the center recessed surface portion 23a of the center back frame 23, needs to be formed to have a sufficient size to resist against the maximum bending moment. However, if the left and right protruding portions 25ac and 25ab of the lower cross member 25, which are fitted into the left and right recessed surface portions 21a and 22a of the left and right side back frames 21 and 22, respectively, are formed to have the same size as the intermediate protruding portion 25ac, the size of the lower cross member 25 is increased. However, according to the lower cross member 25 of the embodiment, the cross-section of the intermediate protruding portion 25ac is formed to be greater than the cross-sections of the left and right recessed surface portions 21a and 22a of the respective left and right side back frames 21 and 22. Accordingly, even if the cross-section of the intermediate protruding portion 25ac is formed to have the sufficient size to resist against the maximum torsional bending moment, the sizes of the left and right recessed surface portions 21a and 22a do not need to be unnecessarily enlarged. Accordingly, the size and the weight of the lower cross member 25 may be reduced.

The closed section portion 23A of the center back frame 23 will be described in detail below with reference to FIGS. 6 to 8. As illustrated in FIG. 6, the closed section portion 23A of the center back frame 23 is obtained by bending the plate-shaped member by roll-forming or by press-forming, so that the plate-shaped member forms the quadrangle-hollow-column shape while being curved to form the recess at the rear portion of the seat. A portion of the closed section portion 23A forming a right side surface thereof is referred to as a first side plate portion 23c. A portion of the closed section portion 23A forming a seat front surface is referred to as a first wall portion 23d. A portion of the closed section portion 23A forming a seat rear surface is referred to as a second wall portion 23e. A portion of a left side surface of the closed section portion 23A forming a surface, which continuously extends from the first wall portion 23d, is referred to as a second side plate portion 23f. Furthermore, a portion of the left side surface of the closed section portion 23A forming a surface, which continuously extends from the second wall portion 23e, is referred to as a third side plate portion 23g.

Figure 7A:
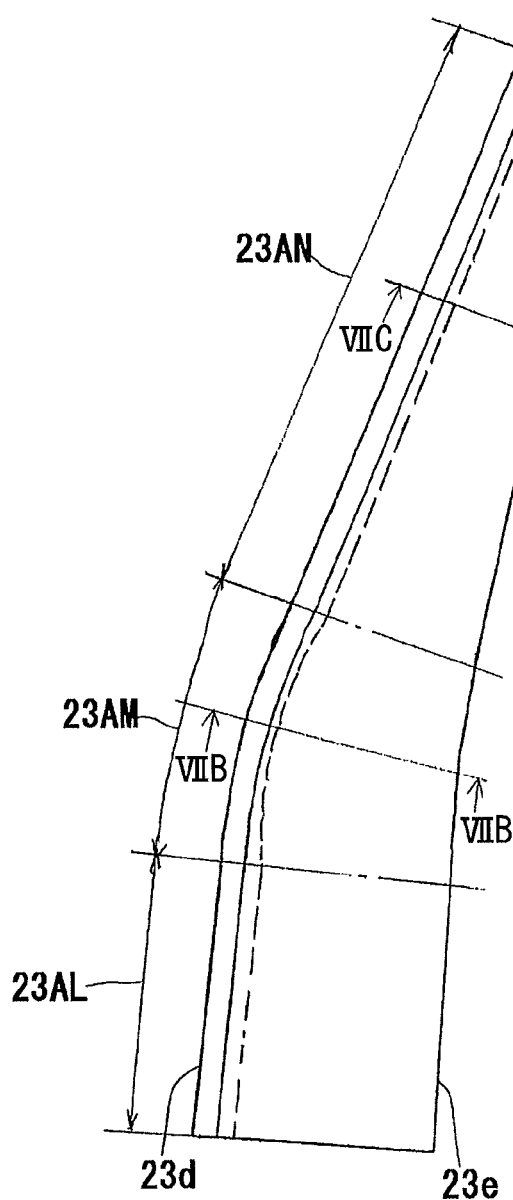
FIG. 7A is a side view illustrating the center back frame.
Figure 7C:
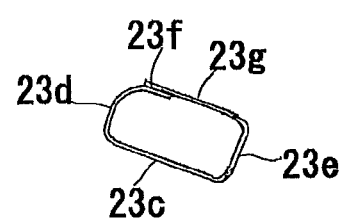
FIG. 7C is a cross-sectional view taken along line VIIC-VIIC in FIG. 7A.
Figure 7B:
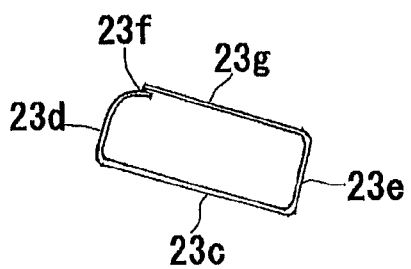
FIG. 7B is a cross-sectional view taken along line VIIB-VIIB in FIG. 7A.

As illustrated in FIG. 7, a lower portion of the closed section portion 23A of the center back frame 23 configures a first linear portion 23AL. The first liner portion 23AL includes a portion of the first wall portion 23d positioned at a front side of the seat and a portion of the second wall portion 23e positioned at a rear side of the seat, whose lateral views form substantially linear shapes. An intermediate portion of the closed section portion 23A configures a curved portion 23AM, which includes a portion of the first wall portion 23d, whose lateral view is greatly curved, and a portion of the second wall portion 23e, whose lateral view is gently curved. An upper portion of the closed section portion 23A configures a second linear portion 23AN, which includes a portion of the first wall portion 23d and a portion of the second wall portion 23e, whose lateral views form substantially linear shapes. The closed section portion 23A of the center back frame 23 is formed so that an area of the cross-sectional shape thereof is the greatest at the a bottom portion of the first linear portion 23AL and gradually decreases from the curved portion 23AM towards the second linear portion 23AN, so that the cross-sectional shape of the closed section portion 23A becomes the smallest at an upper portion of the second linear portion 23AN.

Figure 8A:
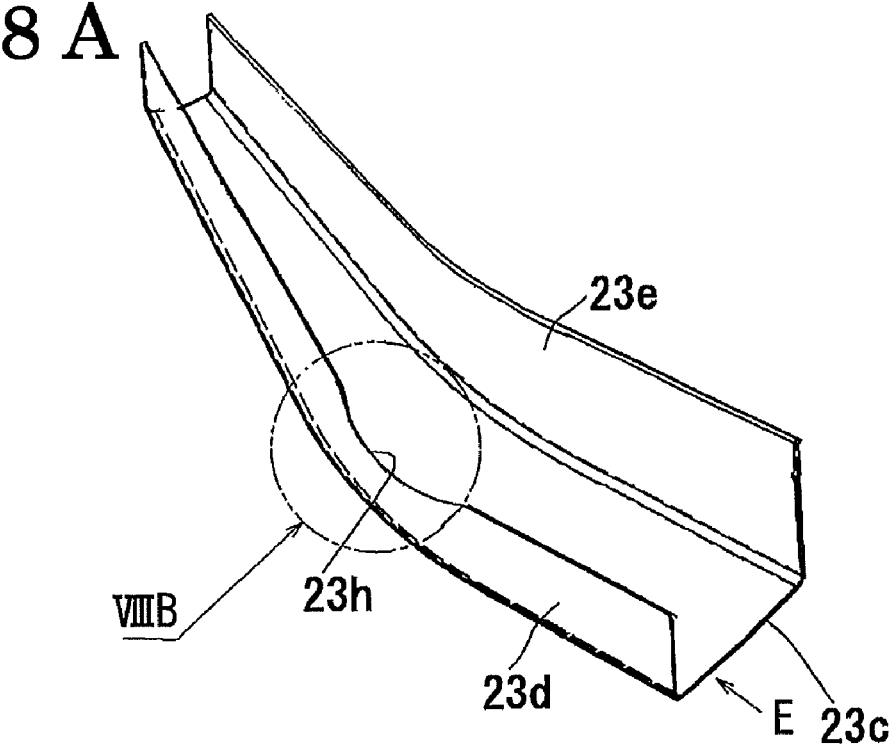
FIG. 8A is a perspective view for explaining a formation of the center back frame.
Figure 8B:
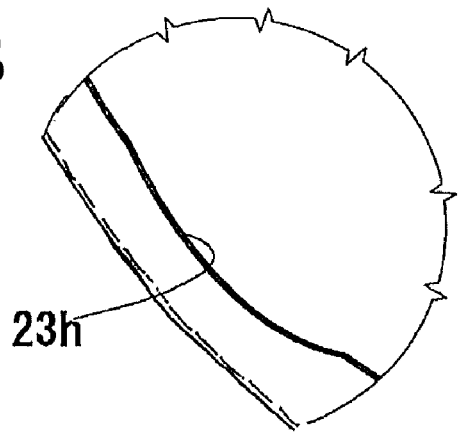
FIG. 8B is a partially enlarged diagram of a portion VIIIB indicated by a circle in FIG. 8A.
Figure 8C:
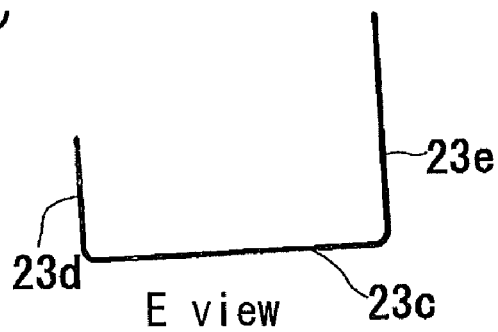
FIG. 8C is an end view of the center back frame being viewed in a direction E.

A forming process of the closed section portion 23A of the center back frame 23 will be described below. Firstly, a plate-shaped member is pressed to have a shape, from which the closed section portion 23A of the center back frame 23 is formable. As illustrated in FIG. 8A, a recessed portion 23h in an arc shape is formed at a portion of the center back frame 23 where a curvature thereof is increased, i.e. at a side end portion corresponding to a portion of the second side plate portion 23f at the curved portion 23AM. Generally, when one side end portion of the first wall portion 23d, which forms the recess at the rear side of the seat, is bent towards the rear side of the seat in order to form the second side plate portion 23f, compression is likely to be generated in the vicinity of a side end portion of the second side plate portion 23f at the curved portion 23AM, which may result in generating an unevenness or a crinkle thereat. However, according to this embodiment, because the recessed portion 23h in the arc shape is formed at the side end portion of the second side plate portion 23f at the curved portion 23AM, the compression generated in the vicinity of the side end portion of the second side plate portion 23f may be reduced, therefore, the unevenness or the crinkle may be avoided from being generated at the second side plate portion 23f. As a result, the surface of the second side plate portion 23f may be formed with high accuracy.

Figure 9A:
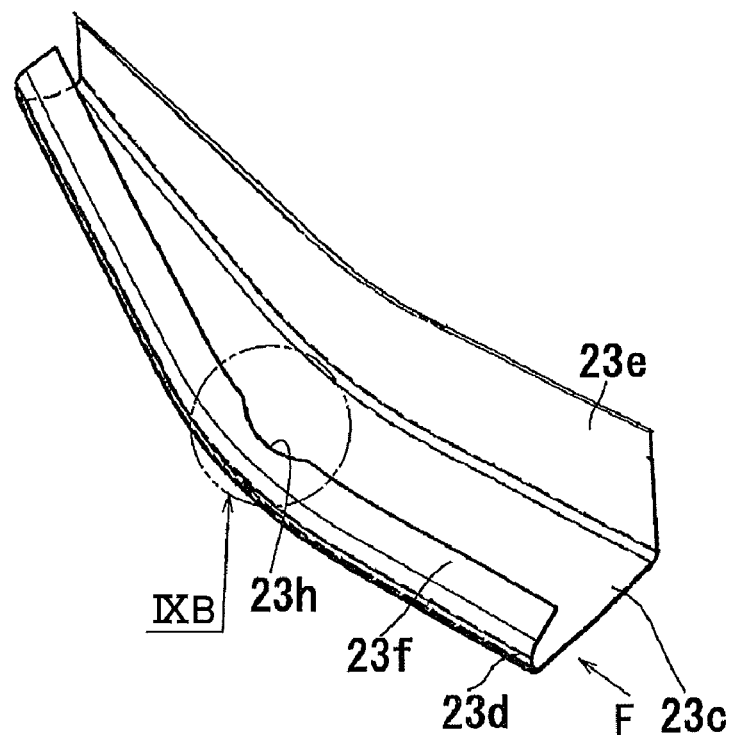
FIG. 9A is a perspective view for explaining a formation of the center back frame.
Figure 10A:
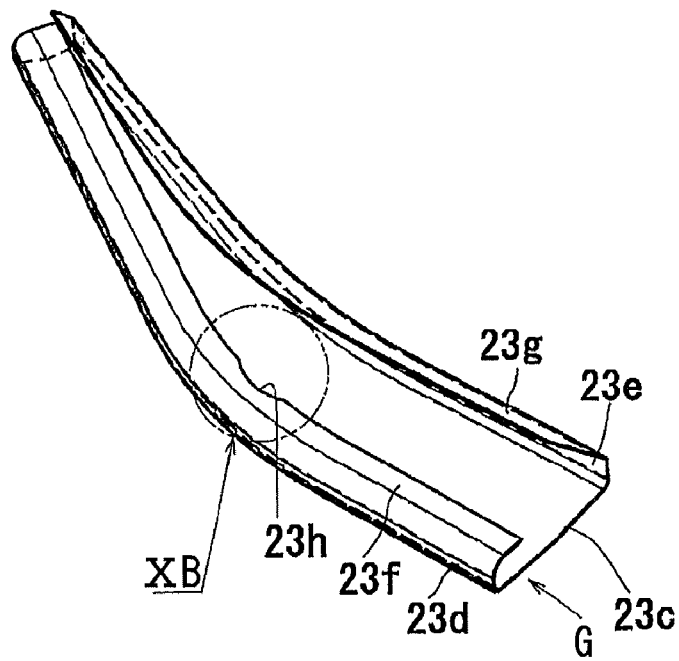
FIG. 10A is a perspective view for explaining a formation of the center back frame.

As illustrated in FIG. 8A, both end portions of the first side plate portion 23c, which configures the right side surface, are bent so as to form the recess at the rear side of the seat, thereby forming the first wall portion 23d, which is positioned at the front side of the seat, and the second wall portion 23e, which is positioned at the rear side of the seat. In this case, as mentioned above, both end portions of the side end portions of the second side plate portion 23f in an up-and-down direction are positioned closer to each other. However, the compression generated in the vicinity of the side end portion of the second side plate portion 23f may be reduced because of the recessed portion 23h in the arc shape. Then, as illustrated in FIG. 9A, one side end portion of the first wall portion 23d is bent towards rear side of the seat, thereby forming the second side plate portion 23f. The second side plate portion 23f is further bent until the second side plate portion 23f becomes substantially in parallel with the first side plate portion 23c, and one side end portion of the second wall portion 23e is bent towards the front side of the seat to form the third side plate portion 23g, as illustrated in FIG. 10A. In this case, the both end portions of the side end portion of the second side plate portion 23f at the curved portion 23AM are positioned further closer to each other. However, the compression generated in the vicinity of the side end portion of the second side plate portion 23f may be reduced because of the recessed portion 23h in the arc shape. Accordingly, the unevenness or the crinkle may be avoided from being generated in the vicinity of the side end portion of the second side plate portion 23f at the curved portion 23AM. As a result, the surface of the second side plate portion 23f may be formed with high accuracy.

Figure 11A:
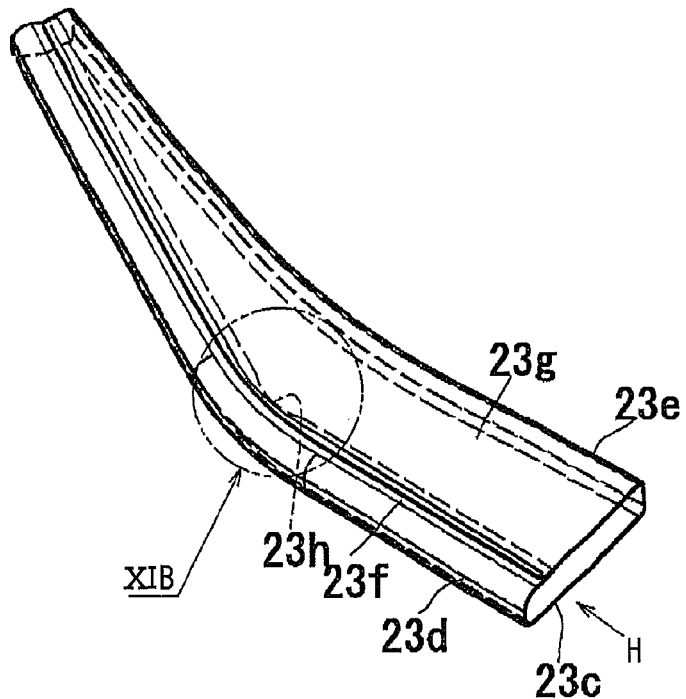
FIG. 11A is a perspective view for explaining a formation of the center back frame.
Figure 11B:
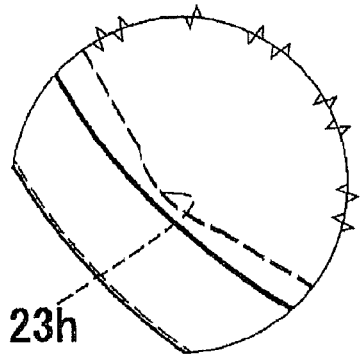
FIG. 11B is a partially enlarged diagram of a portion XIB indicated by a circle in FIG. 11A.
Figure 11C:
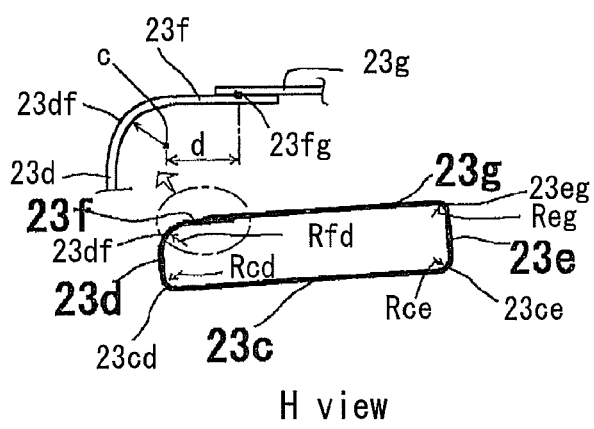
FIG. 11C is an end view of the center back frame being viewed in a direction H.
Figure 12:
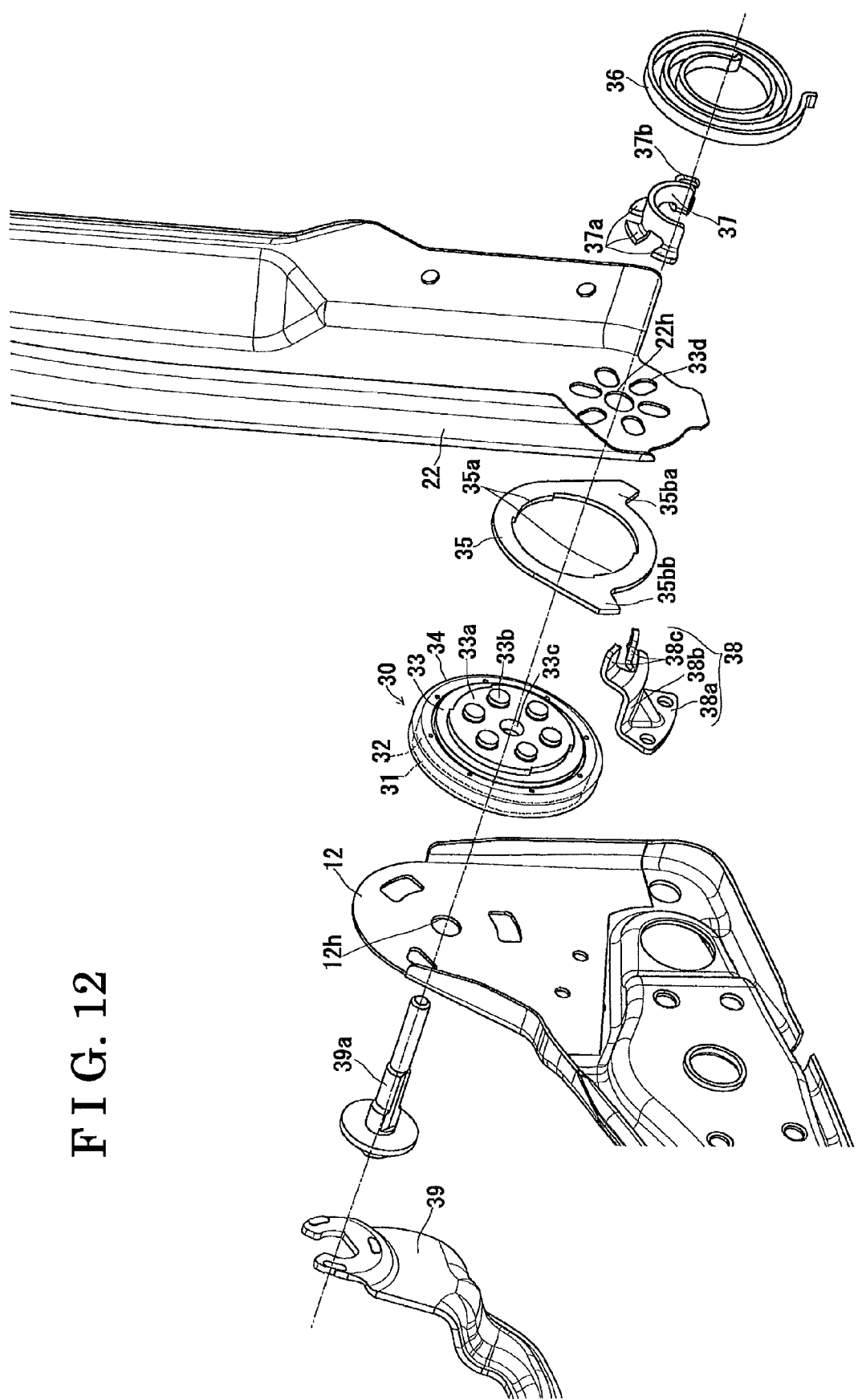
FIG. 12 is an exploded perspective view of a reclining apparatus of the seat frame for the vehicle illustrated in FIG. 1.

In the case where the second side plate portion 23f is formed, a curvature radius Rdf formed at a bent portion 23df between the first wall portion 23d and the second side plate portion 23f is set to be greater than a curvature radius Rcd formed at a bent portion 23cd between the first side plate portion 23c and the first wall portion 23d, a curvature radius Rce formed at a bent portion 23ce formed between the first side plate portion 23c and the second wall portion 23e and a curvature radius Reg formed at a bent portion 23eg between the second wall portion 23e and the third side plate portion 23g (see a diagram viewed in a direction H in FIG. 11A). By forming the curvature radius Rdf at the bent portion 23df to be great, an excessive compression may be avoided from being generated in the vicinity of the side end portion of the second side plate portion 23f. Accordingly, the unevenness or the crinkle may be avoided from being generated in the vicinity of the side end portion of the second side plate portion 23f at the curved portion 23AM. As a result, the surface of the second side plate portion 23f may be formed with further high accuracy.

As illustrated in FIG. 11A, the third side plate portion 23g is further bent until the third side plate portion 23g becomes substantially in parallel with the first side plate portion 23c, so that the third side plate portion 23g is overlapped on the second side plate portion 23f in a manner where the third side plate portion 23g contacts the second side plate portion 23f. In this case, because an accuracy of the surface-forming of the second side plate portion 23f is enhanced, an overlapped portion between the second side plate portion 23f and the third side plate portion 23g is easily and properly connected. Furthermore, because the first side plate portion 23f and the third side plate portion 23g are closely in contact with each other, the second side plate portion 23f and the third side plate portion 23g may be connected by laser welding, which may result in reducing man-hours for forming the center back frame 23.

A connected portion 23fg between the second side plate portion 23f and the third side plate portion 23g is set so that a distance d between the connected portion 23fg and a center point C of the curvature radius formed at the bent portion 23df between the first wall portion 23d and the second side plate portion 23f becomes as small as possible. In other words, the connected portion 23fg is positioned in the vicinity of a corner portion of the center back frame 23 at a front-left side of the seat. In a case where the connected portion 23fg between the second side plate portion 23f and the third side plate portion 23g is positioned in the vicinity of a corner portion of the center back frame 23 at a rear-left side of the seat, a length of the second side plate portion 23f from the bent portion 23df needs to be enlarged. In this case, a further excessive compression is likely to be generated in the vicinity of the side end portion of the second side plate portion 23f because of bending of the second plate portion 23f, an occurrence of the unevenness of the crinkle in the vicinity of the side end portion of the second side plate portion 23f at the curved portion 23AM may be difficult to avoid. Therefore, in this embodiment, the connected portion 23fg between the second side plate portion 23f and the third side plate portion 23g is positioned in the vicinity of the corner portion of the center back frame 23 at the front-left side of the seat, the occurrence of the unevenness or the crinkle in the vicinity of the side end portion of the second side plate portion 23f at the curved portion 23AM may become avoidable. In other words, a position of the connected portion 23fg between the second side plate portion 23f and the third side plate portion 23g is set at an unevenness and crinkle-occurrence avoiding limited position, and at a position where a surface of the second side plate portion 23f and a surface of the third side plate portion 23g contact with each other. Furthermore, as described above, when the vehicle is involved in the crash, the seat belt 51 is pulled forward with the great tensile force because of the inertia of the occupant, therefore, the great load is applied to the shoulder belt anchor 27, which is provided at the center back frame 23. As a result of the great load applied to the shoulder belt anchor 27, the torsional bending moment is generated at the seat back frame 20. In this case, a compression force acts on the first wall portion 23d of the center back frame 23 positioned at the front side of the seat. However, because the connected portion 23fg between the second side plate portion 23f and the third side plate portion 23g is located at a position the distance d away from the first wall portion 23d, a moment smaller than the moment acting on the first wall portion 23d acts on the connected portion 23fg. Therefore, an occurrence of the compression deformation at the connected portion 23fg may be avoidable.

Figure 9B:
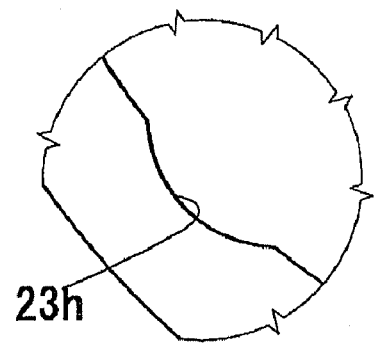
FIG. 9B is a partially enlarged diagram of a portion IXB indicated by a circle in FIG. 9A.
Figure 9C:
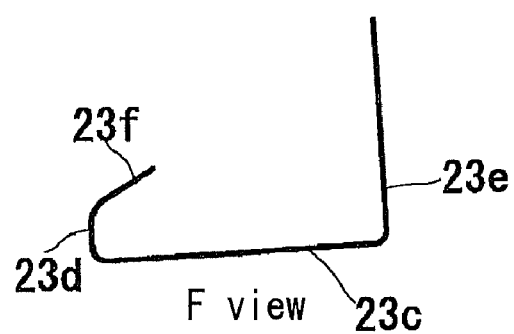
FIG. 9C is an end view of the center back frame being viewed in a direction F.
Figure 10B:
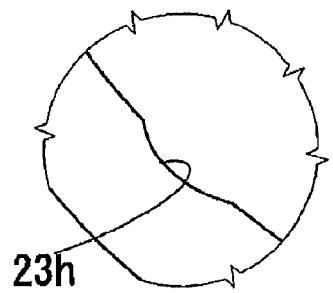
FIG. 10B is a partially enlarged diagram of a portion XB indicated by a circle in FIG. 10A.
Figure 10C:
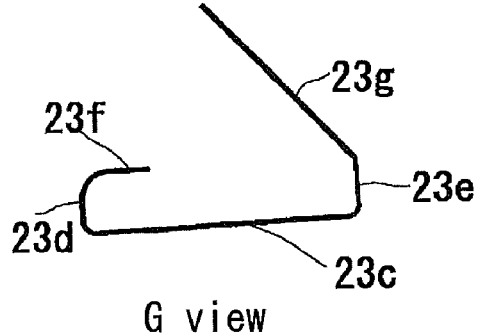
FIG. 10C is an end view of the center back frame being viewed in a direction G.

The reclining apparatus will be described in detail below with reference to FIGS. 9 and 10. The recliner 30 is formed in a disc shape. More specifically, the recliner 30 includes a lower plate 31, an upper plate 33 and a holder 34. The lower plate 31 is attached to the right cushion frame 12 by welding. The upper plate 33 is attached to the right side back frame 22 by welding. The holder 34 covers outer circumferential surfaces of the lower and upper plates 31 and 33. A recessed portion is formed at the lower plate 31 by half cutting, so that the lower plate 31 is arranged to open towards the upper plate 33. The upper plate 33 is fitted into the recessed portion of the lower plate 31 while allowing an inner circumferential surface of the recessed portion of the lower plate 31 and the outer circumferential surface of the upper plate 33 slidably contact with each other. A slidably-contact surface between the lower plate 31 and the upper plate 33 serves as an axis and a bearing in a case where the lower plate 31 and the upper plate 33 rotate. A recessed portion is formed at the upper plate 33 by half cutting, so that the upper plate 33 is arranged to open towards the lower plate 31. A gear 32, with which a reclining lock mechanism is meshed, is formed along an entire inner circumferential portion of the recessed portion of the upper plate 33. A stepped portion 33a in a disc shape is formed at an end surface of the upper plate 33 opposite from a surface at which the recessed portion is formed. A stopper plate 35 is fitted onto the stepped portion 33a. Furthermore, plural column-shaped protruding portions 33b (in this embodiment, six protruding portions 33b) are formed at the end surface of the upper plate 33. The protruding portions 33b are fitted into the right side back frame 22. The protruding portions 33b form a forming pitch circle centering on an axis hole 33c of the upper plate 33 so as to have a predetermined diameter. Furthermore, the protruding portions 33b are provided at an end surface of the stepped portion 33a while forming regular angles (in this embodiment, 60 degrees) between the neighboring protruding portions 33b. The protruding portions 33b are fitted into upper plate holes 33d, which are formed in elliptical shapes at the right side back frame 22.

An attachment mechanism of the recliner 30 includes the stopper plate 35 for controlling an inclined angle of the seat back frame 20, a spiral spring 36 for biasing the seat back frame 20 towards the front side of the seat, a spring mount 37, at which one end portion of the spiral spring 36 is engaged, and a hook 38, at which the other end portion of the spiral spring 36 is engaged and to which the stopper plate 35 contacts. The stopper plate 35 is formed in a ring-plate shape. More specifically, protruding portions 35a are formed at an inner circumferential surface of the stopper plate 35 so as to serve as detent. Furthermore, two protruding portions 35ba and 35bb are formed at circumferential lower portions of the stopper plate 35 while forming a predetermined angle. Furthermore, the protruding portions 35ba and 35bb are formed so as to be contactable with the hook 38. When the protruding portion 35*ba* contacts the hook 38, the seat back frame 20 is inclined to the rear-most position at the seat. On the other hand, when the protruding portion 35*bb* contacts the hook 38, the seat back frame 20 is inclined to the front-most position at the seat. The stopper plate 35 is fitted onto the stepped portion 33*a*, which is formed at the end surface of the upper plate 33 so as to have a shape corresponding to the inner circumferential shape of the stopper plate 35, so as not to rotate relative to each other. Additionally, the upper plate 33 is attached to the right side back frame 22 in a state where the stopper plate 35 is fitted onto the upper plate 33.

The spring mount 37 is formed in a half-cylindrical shape. More specifically, the spring mount 37 includes protruding portions 37*a*, which serve as detents, and an engagement portion 37*b* for engaging one end portion of the spiral spring 36 therewith at an end portion of an outer circumferential surface of the spring mount 37. The spring mount 37 is fixed at the right side back frame 22 by welding and the like in a state where the protruding portions 37*a* are fitted in spaces formed between neighboring protruding portions 33*b* of the upper plate 33 protruding from the respective upper plate holes 33*d* of the right side back frame 22. The engagement portion 37*b* is obtained by being a protruding portion so as to form a clearance relative to the outer circumferential surface of the spring mount 37. An inner end portion of the spiral spring 36 is fitted into the clearance formed between the engagement portion 37*b* and the outer circumferential surface of the spring mount 37, thereby engaging the spiral spring 36 with the spring mount 37.

The hook 38 includes an attachment portion 38*a*, which is formed in a rectangular-plate shape and which is attached to the right cushion frame 12, a contacting portion 38*b*, which extends from one end portion of the attachment portion 38*a* so as to be contactable with the stopper plate 35, and an engagement portion 38*c*, which is formed to protrude from the contacting portion 38*b* in a substantially L-shape so that the other end portion of the spiral spring 36 is engaged with the engagement portion 38*c*. The attachment portion 38*a* is provided at a position of the hook 38 so as to be positioned in the vicinity of a lower portion of the recliner 30, which is attached to the right cushion frame 12, so that the contacting portion 38*b* is contactable only with the protruding portions 35*ba* and 35*bb* of the stopper plate 35, and so that the contacting portion 38*b* and the engagement portion 38*c* do not interfere other components. Additionally, a cut-out is provided at the lower end portion of the right side back frame 22, so that the right side back frame 22 does not interfere with the contacting portion 38*b* of the hook 38. The engagement portion 38*c* is divided into two while forming a clearance therebetween. An outer end portion of the spiral spring 36 is fitted into and engaged within the clearance of the engagement portion 38*c*.

Accordingly, the recliner 30, to which the stopper plate 35 is fitted, is arranged between the right cushion frame 12 and the right side back frame 22. The spiral spring 36 and the spring mount 37 are arranged at the left side relative to the right side back frame 22. A hinge shaft 39*a*, at which an operation lever 39 is fixed, penetrates and is inserted into a shaft hole, which is formed at the right side back frame 22, through a shaft hall 12*h* formed at the right cushion frame 12 and a shaft hall 33*c* formed at the upper plate 33. On the other hand, the recliner 17, which has a similar configuration as the recliner 30, is attached on the center back frame 23. The hinge shaft 39*a* of the recliner 30 is connected to a hinge shaft of the recliner 17 via the connecting shaft 18. When the operation lever 39 is upwardly rotated, the locked state of the reclining lock mechanisms of the recliner 30 and the recliner 17 is cancelled, thereby allowing the seat back 91 to be reclinable forward and rearward.

Generally, a known seat back frame 20 does not include a hook for engaging an end portion of a spiral spring therewith at an outer side relative to a recliner. Therefore, the recliner and the like are likely to be enlarged, which may result in increasing size and weight of a seat (see e.g. JP2008-54712). On the other hand, according to the above-descried embodiment, the engagement portion 38*c* of the hook 38, to which the end portion of the spiral spring 36 is engaged, is arranged at an inner side relative to an outer circumferential portion of the recliner 30. Therefore, the recliner 30 and the like may be reduced in size. Accordingly, the size and the weight of the seat may be reduced.

The case where the manual-type reclining apparatus is adapted as the reclining apparatus is described above. In a case where the power-type reclining apparatus is manufactured on the basis of the manual-type reclining apparatus without largely changing the configuration of the seat, the manufacturing costs may be reduced. Therefore, it may be favorable if each component used at the reclining apparatus is formed so as to be commonly used for both of the manual-type reclining apparatus and the power-type reclining apparatus. However, generally, an external gear of an upper ring, which is provided within the power-type recliner, eccentrically moves relative to an internal gear of a gear plate. Therefore, a forming pitch circle of protruding portions of an upper plate of the power-type reclining apparatus needs to be formed so as to be greater than a forming pitch circle of the protruding portions 33*b* of the upper plate 33 of the manual-type reclining apparatus.

Generally, the upper plate holes are formed at the right back frame so as to correspond to the forming pitch circle of the power-type reclining apparatus or the forming pitch circle of the manual-type reclining apparatus. Therefore, in a case where the components used for the manual-type reclining apparatus are adapted to the power-type reclining apparatus, the right side back frame 22 needs to be newly formed, which may result in an increase of the manufacturing costs (see e.g. JP1009976A). On the other hand, according to the seat back frame 20 of the embodiment, plural upper plate holes 33*d* (in this embodiment, six upper plate holes 33*d*) in the elliptical shapes are formed at the right side back frame 22 in a radial manner centering on the shaft hole 33*c*. Therefore, as illustrated in FIG. 14A, radially inner portions of the respective upper plate holes 33*d* in the elliptical shapes are formed to correspond along the forming pitch circle of the protruding portions 33*b* of the manual-type reclining apparatus. Furthermore, as illustrated in FIG. 14B, radially outer portions of the respective upper plate holes 33*d* in the elliptical shapes are formed to correspond along a forming pitch circle of protruding portions 33 bp of the power-type reclining apparatus. Accordingly, the protruding portions 33 bp of an upper plate 33*p*, which is adapted to the power-type reclining apparatus, may be fitted into the respective upper plate holes 33*d* without reforming the right side back frame 22.

Accordingly, the right side back frame 22 is adaptable to both of the manual-type reclining apparatus and the power-type reclining apparatus without newly forming the right side back frame 22, which may result in reducing the manufacturing costs. In this case, the right side back frame 22 and the upper plate 33 of the manual-type reclining apparatus are connected at a portion pm (a connected portion) connecting the upper plate holes 33*d* of the manual-type reclining apparatus. On the other hand, in the case where the power-type reclining apparatus is adapted to the seat back frame 20 of this embodiment, the right side back frame 22 and the upper plate 33p are connected at a portion pp (a connected portion) positioned at a radially outer side relative to the upper plate holes 33d. The right side back frame 22 is connected to the upper plate 33 of the manual-type reclining apparatus at the portion pm by laser welding or arc welding. Similarly, the right side back frame 22 is connected to the upper plate 33p of the power-type reclining apparatus by the laser welding or the arc welding. Accordingly, the connection strength between the upper plate 33 and the right side back frame 22, and between the upper plate 33 p and the right side back frame 22 may be ensured.

In this embodiment, the protruding portion 25a is formed at the lower cross member 25. Furthermore, the left recessed surface portion 21a and the right recessed surface portion 22a, to which the protruding portion 25a is fitted, are formed at the left and right side back frames 21 and 22, respectively. However, the back seat frame of the embodiment may be modified so that a recessed portion is formed at the lower cross member 25, a left protruding surface portion (the second protruding surface portion) and a right protruding surface portion (the second protruding surface portion), with which the recessed portion of the lower cross member 25 engages, are formed at the respective left and right side back frames 21 and 22, and a center protruding surface portion (the first protruding surface portion), with which the recessed portion of the lower cross member 25 engages, is formed at the center back frame 23. Even in this case, advantages and merits similar to the advantages and merits described above are achievable.

According to the seat back frame 20 of the embodiment, the protruding portion 25a or the recessed portion is formed at the lower cross member 25 so as to extend in the longitudinal direction thereof, the center recessed surface portion 23a or the center protruding surface portion is formed at the center back frame 23, the left and right recessed surface portions 21a and 22a or the left and right protruding surface portions are formed at the respective left and right side back frames 21 and 22, so that the protruding portions 25a or the recessed portion of the lower cross member 25 engages with the center recessed surface portion 23a or the center protruding surface portion and the left and right recessed surface portions 21a and 22a or the left and right protruding surface portions. Accordingly, the center back frame 23, the left side back frame 21 and the right side back frame 22 on the one hand and the lower cross member 25 on the other hand are connected to each other in a manner where the surfaces of respective center back frame 23, the left side back frame 21 and the right side back frame 22 contact the surface of the lower cross member 25 (i.e. the surface contact). Therefore, the connection strength at the connected portions between center back frame 23, the left side back frame 21 and the right side back frame 22 on the one hand and the lower cross member 25 on the other hand may be increased. Furthermore, because the cross-section of the lower cross member 25 is formed in the uneven shape. The rigidity of the lower cross member 25 may be increased. Accordingly, even in the case where the seat belt 51 is pulled forward with the great tensile force because of the inertia of the occupant when the vehicle is involved in the crash, so that the great load is applied to the shoulder belt anchor 27, which is provided at the center back frame 23, and the torsional bending moment is generated at the seat back frame 20 because of the load, the occurrence of the compression deformation or the fracture at the connected portions between the center back frame 23, the left side back frame 21 and the right side back frame 22 on the one hand and the lower cross member 25 on the other hand may be avoidable. As a result, the occurrence of the compression deformation of the lower cross member 25 may be avoidable.

Furthermore, the lower cross member 25 in the band-plate shape is formed so that the width we at the connected portion, at which the center back frame 23 and the lower cross member 25 are connected, is set to be wider than the widths wa and wb at the connected portions between the lower cross member 25 on the one hand and the left and the right side back frames 21 and 22 on the other hand. The torsional bending moment, which is generated when the vehicle is involved in the crash, is likely to reach the maximum at the connected portion between the lower cross member 25 and the center back frame 23. Hence, the compression deformation or the fracture is likely to be generated at the connected portion when the vehicle is involved in the crash. Therefore, generally, the connected portion between the lower cross member 25 and the center back frame 23 needs to be formed to have a sufficient width to resist against the maximum torsional bending moment. However, if the lower cross member is formed in the rectangle shape while having the sufficient width to resist against the maximum torisonal bending moment, the size of the lower cross member is likely to be increased. On the other hand, according to the lower cross member 25 having the above-described configuration, even if the connected portion of the lower cross member 25, at which the lower cross member 25 and the center back frame 23 are connected, is formed to have the sufficient width to resist against the maximum torsional bending moment, the widths of the connected portions, at which the lower cross member 25 contacts the left and right side back frames 21 and 22, do not need to be unnecessarily enlarged. As a result, the size and the weight of the lower cross member 25 may be reduced.

Furthermore, according to the embodiment, the center back frame 23 is formed so that the cross-sectional shape of the center recessed surface portion 23a or the center protruding surface portion thereof becomes greater than the cross-sectional shapes of the left and right recessed surface portions 21a and 22a or the left and right protruding surface portions of the respective left and right side back frame 21 and 22. Accordingly, the cross-sectional shape of protruding portion 25ac or a recessed portion of the protruding portion 25a, which is engaged with the center recessed surface portion 23a or the center protruding surface portion of the center back frame 23, is also formed to be greater than the protruding portions 25aa and 25ab or the recessed portions of the lower cross member 25, which are engaged with the left and right recessed surface portions 21a and 22a or the left and right protruding surface portions of the left and right side back frames 21 and 22, respectively.

The torsional bending moment, which is generated when the vehicle is involved in the crash, becomes the maximum at the connected portion between the center back frame 23 and the lower cross member 25. Therefore, the compression deformation or the fracture is likely to be generated at the connected portion between the center back frame 23 and the lower cross member 25. Hence, generally, the protruding portion 25ac or the recessed portion of the lower cross member 25, which is engaged with the center recessed surface portion 23a or the center protruding surface portion of the center back frame 23, needs to have a sufficient size to resist against the maximum torsional bending moment. However, if the entire protruding portion 25a or the entire recessed portion of the lower cross member 25, which are engaged with the left and right recessed surface portions 21a and 22a or the left and right protruding surface portions of the respective left and right side back frames 21 and 22, is formed to have the same size as the protruding portion 25ac or the recessed portion of the lower cross member 25, the size of the lower cross member 25 is increased. On the other hand, according to the lower cross member 25 having the above-described configuration, even if the protruding portion 25ac or the recessed portion of the lower cross member 25, which is engaged with the center recessed surface portion 23a or the center protruding surface portion of the center back frame 23, is formed to have the sufficient size to resist against the maximum torsional bending moment, the protruding portions 25ac and 25ab or the recessed portions, which are engaged with the respective left and right recessed surface portions 21a and 22a or the left and right protruding surface portions of the respective left and right side back frames 21 and 22, do not need to be unnecessarily enlarged. Therefore, the size and the weight of the lower cross member 25 may be reduced.

According to the embodiment, the center back frame 23 includes the closed section portion 23A and the open section portion 23B. Furthermore, the center recessed surface portion 23a or the center protruding portion is formed at the open section portion 23B, so that the lower cross member 25 is connected thereto. According to the center back frame 23 having the above-described configuration, the rigidity thereof is ensured because of the closed section portion 23A, while the weight of the center back frame 23 is reduced because of the open section portion 23B. Furthermore, because the open section portion 23B is reinforced by the lower cross member 25, the rigidity of the seat back frame 20 is further enhanced. Additionally, in this embodiment, the case where the seat back frame 20 is adapted to the seat for two passengers. However, the seat back frame 20 of the embodiment may be adapted to a seat for one passenger.

Accordingly, both end portions of the first side plate portion 23c, which form one side surface, of the center back frame 23, which is formed in the hollow rectangular column shape, are bent so as to form the recess at the rear side of the seat, thereby forming the first wall portion 23d positioned at the front side of the seat and the second wall portion 23e positioned at the rear side of the seat. One side end portion of the first wall portion 23d is bent towards the rear side of the seat so as to be substantially in parallel with the first side plate portion 23c, thereby forming the second side plate portion 23f. Similarly, one side end portion of the second wall portion 23e is bent towards the front side of the seat so as to be substantially in parallel with the first side plate portion 23c, thereby forming the third side plate portion 23g. The third side plate portion 23g is overlapped on the second side plate portion 23f, so that the third side plate portion 23g contacts the second side plate portion 23f. More specifically, the overlapped portion between the second side plate portion 23f and the third side plate portion 23g are connected at a portion of the overlapped portion in the vicinity of the bent portion 23df between the first wall portion 23d and the second side plate portion 23f.

In the case where the connected portion 23fg between the second side plate portion 23f and the third side plate portion 23g is positioned in the vicinity of the bent portion 23eg between the second wall portion 23e and the third side plate portion 23g, the length of the second side plate portion 23f from the bent portion 23df between the first wall portion 23d and the second side plate portion 23f needs to be increased. However, the excessive compression may be generated in the vicinity of the side end portion of the second side plate portion 23f because of bending, the occurrence of the unevenness or the crinkle in the vicinity of the side end portion of the second side plate portion 23f may be difficult to avoid. Therefore, in this embodiment, the connected portion 23fg between the second side plate portion 23f and the third side plate portion 23g is positioned in the vicinity of the bent portion 23df between the first wall portion 23d and the second side plate portion 23f, so that the occurrence of the unevenness or the crinkle in the vicinity of the side end portion of the second side plate portion 23f is avoidable. Furthermore, in the case where the vehicle is involved in the crash and the seat belt 51 is pulled forward with the great tensile force because of the inertia of the occupant, the great load is applied to the shoulder belt anchor 27, which is provided at the center back frame 23, so that the torsional bending force is generated at the seat back frame 20 because of the load applied to the shoulder belt anchor 27. As a result, the compression force acts on the first wall portion 23d positioned at the front side of the seat. However, according to the embodiment, because the connected portion 23fg between the second side plate portion 23f and the third side plate portion 23g is positioned in the vicinity of the first wall portion 23d, a smaller bending moment than the moment acting on the first wall portion 23d acts on the connected portion 23fg. Accordingly, the occurrence of the compression deformation at the connected portion 23fg may be avoidable.

The recessed portion 23h is formed at the side end portion of the second side plate portion 23f at the portion 23AM, at which the curvature of the center back frame 23 is increased. Generally, in the case where one end portion of the first wall portion 23d, at which the recess is formed to as to be positioned at the rear side of the seat, is bent towards the rear side of the seat in order to form the second side plate portion 23f, the compression is likely to occur in the vicinity of the side end portion of the second side plate portion 23f, which may result in generating the unevenness or the crinkle in the vicinity of the side end portion of the second side plate portion 23f at the portion 23AM, at which the curvature of the center back frame 23 is increased. However, according to the embodiment, because the recessed portion 23h is formed at the side end portion of the second side plate portion 23f at the portion 23AM, at which the curvature of the center back frame 23 is increased, the compression in the vicinity of the side end portion of the second side plate portion 23f may be reduced, which may result in avoiding the occurrence of the unevenness or the crinkle at the second side plate portion 23f. Accordingly, the surface of the second side plate portion 23f may be formed with high accuracy. Furthermore, the second side plate portion 23f and the third side plate portion 23g are easily and surely connected at the overlapped portion therebetween.

Furthermore, the bent portion 23df between the first wall portion 23d and the second side plate portion 23f is formed so that the curvature radius Rdf at the bent portion 23df is set to be greater than other curvature radiuses Rcd, Rce and Reg (i.e. the curvature radius Rcd at the bent portion 23cd between the first side plate portion 23c and the first wall portion 23d, the curvature radius Rce at the bent portion 23ce between the first side plate portion 23c and the second wall portion 23e and the curvature radius Reg at the bent portion 23eg between the second wall portion 23e and the third side plate portion 23g). Accordingly, the compression generated in the vicinity of the side end portion of the second side plate portion 23f is reduced, which may further result in avoiding the occurrence of the unevenness or the crinkle in the vicinity of the side end portion of the second side plate portion 23f. As a result, the surface of the second side plate portion 23f is formed with high accuracy, which may further result in easily and surely connecting the second side plate portion 23f and the third side plate portion 23g at the overlapped portion therebetween. In the above-described embodiment, the seat back frame 20 is adapted to the seat for two passengers. However, the seat back frame 20 may be adapted to a seat for one passenger.

According to the embodiment, the seat back frame 20 for supporting the seat back 91 includes the center back frame 23, which is formed in a hollow angular column shape and at which the shoulder belt anchor 27 for supporting one end portion of the seat belt 51 is provided. Furthermore, the seat back frame 20 includes the left and right side back frames 21 and 22, which are arranged at the left and right sides relative to the center back frame 23 so as to be substantially in parallel with each other (i.e. so as to be substantially aligned with each other). The center back frame 23 includes the first side plate portion 23c forming one side surface of the first back frame 23, the first wall portion 23d and the second wall portion 23e, which are formed by bending both end portions of the first side plate portion 23f so as to form the recess at the rear side of the seat, so as to be positioned at the rear side and a front side of the seat, respectively, the second side plate portion 23f, which is obtained by bending the side end portion of the first wall portion 23d towards the rear side of the seat so as to become substantially in parallel with the first side plate portion 23c, and the third side plate portion 23g, which is obtained by bending the side end portion of the second wall portion 23e towards the front side of the seat so as to become substantially in parallel with the first side plate portion 23c. The third side plate portion 23g is overlapped on the second side plate portion 23f so as to be in contact with each other, and the second side plate portion 23f and the third side plate portion 23g are connected at the overlapped portion in the vicinity of the bent portion between the first wall portion 23d and the second side plate portion 23f.

In the case where the connected portion between the second side plate portion 23f and the third side plate portion 23g is positioned in the vicinity of the bent portion between the second wall portion 23e and the third side plate portion 23g, the length of the second side plate portion 23f from the bent portion between the first wall portion 23d and the second side plate portion 23f needs to be increased. In this case, the excessive compression may be generated in the vicinity of the side end portion of the second side plate portion 23f when being bent to from the second side plate portion 23f. Therefore, the occurrence of the unevenness or the crinkle in the vicinity of the side end portion of the second side plate portion 23f may be difficult to be avoided. Therefore, in this embodiment, the connected portion between the second side plate portion 23f and the third side plate portion 23g is positioned in the vicinity of the bent portion between the first wall portion 23d and the second side plate portion 23f. Accordingly, the occurrence of the unevenness or the crinkle in the vicinity of the side end portion of the second side plate portion 23f may be avoidable. Furthermore, in the case where the vehicle is involved in the crash and the seat belt 51 is pulled forward with the great tensile force because of the inertia of the occupant, the great load is applied to the shoulder belt anchor 27, which is provided at the center back frame 23, which may result in generating the torsional bending moment at the seat back frame 20 because of the load applied to the shoulder belt anchor 27. As a result, the compression force acts on the first wall portion 23d positioned at the front side of the seat. However, according to the embodiment, because the connected portion between the second side plate portion 23f and the third side plate portion 23g is positioned in the vicinity of the first wall portion 23d, a smaller bending moment than the moment acting on the first wall portion 23d acts on the connected portion. Accordingly, the occurrence of the compression deformation at the bending portion may be avoidable.

According to the embodiment, the recessed portion 23h is formed at the side end portion of the second side plate portion 23f at the portion 23AM, at which the curvature of the center back-side frame 23 is increased. Furthermore, according to the embodiment, the bent portion between the first wall portion 23d and the second side plate portion 23f is formed so that the curvature radius at the bent portion is set to be greater than the curvature radiuses at other bend portions of the center back frame 23.

Generally, in the case where the one side portion of the first wall portion 23d is bent towards the rear side of the seat in order to form the second side plate portion 23f, the compression is likely to be generated in the vicinity of the side end portion of t second side plate portion 23f, which may further result in generating the unevenness or the crinkle in the vicinity of the side end portion of the second side plate portion 23f at the portion 23AM, at which the curvature of the center back frame 23 increases. However, according to the embodiment, because the recessed portion 23h is formed at the side end portion of the second side plate portion 23f at the portion 23AM, at which the curvature of the center back frame 23 increases, the compression generated in the vicinity of the second side plate portion 23f may be reduced, which may result in avoiding the occurrence of the unevenness or the crinkle at the second side plate portion 23f. As a result, the surface of the second side plate 23f may be formed with high accuracy. Furthermore, the second side plate 23f and the third side plate 23g may be easily and surely connected with each other.

Accordingly, the occurrence of the unevenness or the crinkle generated in the vicinity of the side end portion of the second side plate portion 23f may be further avoidable. Accordingly, because the surface of the second side plate 23f is formed with high accuracy, the second side plate portion 23f and the third side plate portion 23g may be further easily and surely connected with each other.

The lower cross member 25 includes the protruding portion 25a or the recessed portion so as to extend in the longitudinal direction thereof. The center back frame 23 includes the center recessed surface portion 23a or a center protruding surface portion, which is fittedly connected to the protruding portion 25a or the recessed portion of the lower cross member 25. Furthermore, the left side back frame 21 and the right side back frame 22 includes the left recessed surface portion 21a and the right recessed surface portion 22a or a left protruding surface portion or a right recessed surface portion, respectively, so that the left recessed surface portion 21a and the right recessed surface portion 22a or a left protruding surface portion or a right recessed surface portion are fittedly connected to the protruding portion 25a or the recessed portion of the lower cross member 25. Accordingly, the center back frame 23, the left side back frame 21 and the right side back frame 22 on the one hand and the lower cross member 25 on the other contact with one another at the surfaces of the center back frame 23, the left side back frame 21, the right side back frame 22 and the lower cross member 25, therefore, the connection strength at the connected portions (connected surfaces) between the center back frame 23, the left side back frame 21 and the right side back frame 22 on the one hand and the lower cross member 25 on the other may be increased. Additionally, because the lower cross member is formed so that the cross-sectional shape thereof is formed to be uneven, the rigidity of the lower cross member may be increased. Therefore, even if the vehicle is involved in the crash and the seat belt 51 is pulled forward with the great tensile force because of the inertia generated by the occupant, so that the great load is applied to the shoulder belt anchor 27 and the torsional bending moment is generated at the seat back frame 20 for the vehicle because of the load applied to the shoulder belt anchor 27, the occurrence of the compression deformation or the fracture at the connected portions between the center back frame 23, the left side back frame 21 and the right side back frame 22 on the one hand and the lower cross member 25 on the other may be avoided. Furthermore, the occurrence of the compression deformation of the lower cross member 25 may be avoidable.

According to the embodiment, the lower cross member 25 is formed in the band-plate shape so that the width of the portion of the lower cross member 25 connected to the center back frame 23 is set to be wider than the width of the portions of the lower cross member 25 connected to the left and right side back frames 21 and 22, respectively.

Accordingly, the lower cross member 25 in the band-plate shape is formed so that the width of the portion of the lower cross member 25 connected to the center back frame 23 is set to be wider than the width of the portions of the lower cross member 25 connected to the left and right side back frames 21 and 22. The torsional bending moment generated when the vehicle is involved in the crash is likely to become the maximum at the connected portion between the center back frame 23 and the lower cross member 25. Therefore, the compression deformation or the fracture is likely to be generated at the connected portion between the center back frame 23 and the lower cross member 25. Hence, the connected portion between the center back frame 23 and the lower cross member 25 needs to have a sufficient width to resist against the maximum torsional bending moment. However, if the lower cross member is formed in the rectangular shape having the sufficient width to resist against the maximum torsional bending moment, the lower cross member 25 is likely to be enlarged. However, according to the above-described configuration of the lower cross member 25, even if the connected portion between the lower cross member 25 and the center back frame 23 is formed to have the sufficient width to resist against the maximum torsional bending moment, the connected portions between the lower cross member 25 on the one hand and the left and right side back frames 21 and 22 on the other hand are avoided from unnecessarily being enlarged. Accordingly, the size and the weight of the lower cross member 25 may be reduced.

According to the embodiment, the center back frame 23 is formed so that the cross-sectional area of the center recessed portion 23a or the first protruding surface portion thereof is set to be greater than the cross-sectional area of the left and right recessed surface portions 21a and 22a or the left and right protruding surface portion of the left and right side back frames 21 and 22, respectively.

Accordingly, the center recessed surface portion 23a or the center protruding surface portion of the center back frame 23 is formed so that the cross-sectional area thereof is formed to be greater than the cross-sectional area of the left recessed surface portion 21a and the right recessed surface portion 22a or the left protruding surface portion and the right protruding surface portion of the left side back frame 21 and the right back frame 22, respectively. Accordingly, the lower cross member 25 is also formed so that the cross-sectional area of a portion of the protruding portion 25a or the recessed portion thereof fittedly connected to the center recessed surface portion 23a or the center protruding surface portion of the center back frame 23 is set to be greater than the cross-sectional area of portions of the protruding portion 25a or the recessed portion fittedly connected to the respective left recessed surface portion 21a and the right recessed surface portion 22a or the respective left protruding surface portion and the right protruding surface portion (i.e. the left-end protruding portion 25aa and the right-end protruding portion 25ab or a left-end recessed portion and a right-end recessed portion).

The torsional bending moment generated when the vehicle is involved in the crash becomes the maximum at the connected portion between the center back frame 23 and the lower cross member 25. Therefore, the compression deformation or the fracture is likely to occur at the connected portion between the center back frame 23 and the lower cross member 25. Hence, the portion of the protruding portion 25a or the recessed portion of the lower cross member 25 (i.e. the intermediate protruding portion 25ac or the intermediate recessed portion) fittedly connected to the center recessed surface portion 23a or the center protruding surface portion of the center back frame 23 needs to have a sufficient size so as to resist against the maximum torsional bending moment. However, if the portions of the protruding portion 25a or the recessed portion of the lower cross member 25 (i.e. the left-end protruding portion 25aa and the right-end protruding portion 25eb or the left-end recessed portion and the right-end recessed portion of the lower cross member) fittedly connected to the left recessed surface portion 21a and the right recessed surface portion 22a or the left protruding surface portion and the right protruding surface portion of the left and right side back frames 21 and 22, respectively, are formed to have the same size as the portion of the protruding portion 25a or the recessed portion of the lower cross member 25 (i.e. the intermediate protruding portion 25ac or the intermediate recessed portion) fittedly connected to the center recessed surface portion 23a or the center protruding surface portion of the center back frame 23, the size of the lower cross member 25 is likely to be increased. However, according to the lower cross member 25 having the above-described configuration, even if the portion of the protruding portion 25a or the recessed portion of the lower cross member 25 (i.e. the intermediate protruding portion 25ac or the intermediate recessed portion) fittedly connected to the center recessed surface portion 23a or the center protruding surface portion of the center back frame 23 is formed to have the sufficient size to resist against the maximum torsional bending moment, the portions of the protruding portion 25a or the recessed portion of the lower cross member 25 (i.e. the left-end protruding portion 25aa and the right-end protruding portion 25eb or the left-end recessed portion and the right-end recessed portion of the lower cross member) fittedly connected to the left recessed surface portion 21a and the right recessed surface portion 22a or the left protruding surface portion and the right protruding surface portion of the left and right side back frames 21 and 22, respectively, do not necessarily be enlarged. Accordingly, the size and the weight of the lower cross member 25 may be reduced.

According to the embodiment, the center back frame 23 includes the closed section portion 23A and the open section portion 23B. The center recessed portion 23a or the first protruding surface portion is formed at the open section portion 23B of the center back frame 23.

Accordingly, the center back frame 23 includes the closed section portion 23A and the open section portion 23B, so that the center recessed surface portion 23a or the center protruding surface portion of the center back frame 23 is formed at the open section portion 23B, at which the lower cross member is connected. Accordingly, the center back frame 23 having the above-described configuration ensures the rigidity at the closed section portion 23A, while the weight of the center back frame 23 is reduced because of the open section portion 23B. Furthermore, the rigidity of the center back frame 23 at the open section portion 23B is reinforced by the lower cross member.

According to the embodiment, the second back frame includes a pair of left and right side back frames 21 and 22 positioned at the left and right portions of the seat back 91, respectively. The first back frame includes the center back frame 23 arranged between the pair of the left and right side back frames 21 and 22. Furthermore, the lower cross member 25 is arranged so as to connect the pair of the left and right side back frames 21 and 22 and the center back frame 23.

Accordingly, the seat back frame 20 for the vehicle according to the embodiment is adaptable to any seat used for, for example, a rear seat, and for any desired number of occupant(s).

According to the embodiment, the center back frame 23 is formed in the hollow angular column shape. Furthermore, the center back frame 23 includes the first side plate portion 23c forming one side surface of the center back frame 23, the first wall portion 23d and the second wall portion 23e, which are formed by bending the end portions of the first side plate portion 23c so as to form the recess at the rear side of a seat, so as to be positioned at the rear side and the front side of the seat, respectively, the second side plate portion 23f, which is obtained by bending the side end portion of the first wall portion 23d towards the rear side of the seat so as to become substantially in parallel with the first side plate portion 23c, and the third side plate portion 23g, which is obtained by bending the side end portion of the second wall portion 23e towards the front side of the seat so as to become substantially in parallel with the first side plate portion 23c. The third side plate portion 23g is overlapped on the second side plate portion 23f so as to be in contact with each other. Furthermore, the second side plate portion 23f and the third side plate portion 23g are connected at the overlapped portion in the vicinity of the bent portion between the first wall portion 23d and the second side plate portion 23f.

In the case where the connected portion between the second side plate portion 23f and the third side plate portion 23g is positioned in the vicinity of the bent portion between the second wall portion 23e and the third side plate portion 23g, the length of the second side plate portion 23f from the bent portion between the first wall portion 23d and the second side plate portion 23f needs to be increased. In this case, the excessive compression may be generated in the vicinity of the side end portion of the second side plate portion 23f when being bent to from the second side plate portion 23f. Therefore, the occurrence of the unevenness or the crinkle in the vicinity of the side end portion of the second side plate portion 23f may be difficult to be avoided. Therefore, in this embodiment, the connected portion between the second side plate portion 23f and the third side plate portion 23g is positioned in the vicinity of the bent portion between the first wall portion 23d and the second side plate portion 23f. Accordingly, the occurrence of the unevenness or the crinkle in the vicinity of the side end portion of the second side plate portion 23f may be avoidable. Furthermore, in the case where the vehicle is involved in the crash and the seat belt 51 is pulled forward with the great tensile force because of the inertia of the occupant, the great load is applied to the shoulder belt anchor 27, which is provided at the center back frame 23, which may result in generating the torsional bending moment at the seat back frame 20 because of the load applied to the shoulder belt anchor 27. As a result, the compression force acts on the first wall portion 23d positioned at the front side of the seat. However, according to the embodiment, because the connected portion between the second side plate portion 23f and the third side plate portion 23g is positioned in the vicinity of the first wall portion 23d, a smaller bending moment than the moment acting on the first wall portion 23d acts on the connected portion. Accordingly, the occurrence of the compression deformation at the bending portion may be avoidable.

According to the embodiment, the recessed portion 23h is formed at the side end portion of the second side plate portion 23f at the portion 23AM at which the curvature of the center back frame 23 increases.

Generally, in the case where the one side portion of the first wall portion 23d is bent towards the rear side of the seat in order to form the second side plate portion 23f, the compression is likely to be generated in the vicinity of the side end portion of t second side plate portion 23f, which may further result in generating the unevenness or the crinkle in the vicinity of the side end portion of the second side plate portion 23f at the portion 23AM, at which the curvature of the center back frame 23 increases. However, according to the embodiment, because the recessed portion 23h is formed at the side end portion of the second side plate portion 23f at the portion 23AM, at which the curvature of the center back frame 23 increases, the compression generated in the vicinity of the second side plate portion 23f may be reduced, which may result in avoiding the occurrence of the unevenness or the crinkle at the second side plate portion 23f. As a result, the surface of the second side plate 23f may be formed with high accuracy. Furthermore, the second side plate 23f and the third side plate 23g may be easily and surely connected with each other.

According to the embodiment, the bent portion between the first wall portion 23d and the second side plate portion 23f is formed so that the curvature radius at the bent portion is set to be greater than the curvature radiuses of other bent portions at the center back frame 23.

Accordingly, the occurrence of the unevenness or the crinkle generated in the vicinity of the side end portion of the second side plate portion 23f may be further avoidable. Accordingly, because the surface of the second side plate 23f is formed with high accuracy, the second side plate portion 23f and the third side plate portion 23g may be further easily and surely connected with each other.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the disclosure. Accordingly, it is expressly intended that all such variations, changes and equivalents which fall within the spirit and scope of the present invention as defined in the claims, be embraced thereby.

The invention claimed is:

1. A seat back frame for a vehicle for supporting a seat back, comprising:
 a first back frame, at which a shoulder belt anchor for supporting one end portion of a seat belt is provided, the first back frame including a closed section portion and an open section portion;
 a second back frame arranged substantially in parallel with the first back frame;
 a cross member arranged so as to connect the first back frame and the second back frame;
 one of a protruding portion or a recessed portion formed at the cross member so as to extend in a longitudinal direction thereof;

one of a complementary first recessed surface portion or a first protruding surface portion formed at the open section portion of the first back frame so as to be complementarily connected to the protruding portion or the recessed portion of the cross member, and one of a complementary second recessed surface portion or a second protruding surface portion formed at the second back frame so as to be complementarily connected to the protruding portion or the recessed portion of the cross member.

2. The seat back frame for the vehicle according to claim 1, wherein the cross member is formed in a band-plate shape so that a width of a portion of the cross member connected to the first back frame is set to be wider than a width of a portion of the cross ember connected to the second back frame.

3. The seat back frame for the vehicle according to claim 2, wherein the first back frame is formed so that a cross-sectional area of the first recessed surface portion or the first protruding surface portion thereof is set to be greater than a cross-sectional area of the second recessed surface portion or the second protruding surface portion of the second back frame.

4. The seat back frame for the vehicle according to claim 1, wherein the first back frame is formed so that a cross-sectional area of the first recessed surface portion or the first protruding surface portion thereof is set to be greater than a cross-sectional area of the second recessed surface portion or the second protruding surface portion of the second back frame.

5. The seat back frame for the vehicle according to claim 1, wherein the second back frame includes a pair of side frames positioned at left and right portions of the seat back, respectively, the first back frame includes a center frame arranged between the pair of the side frames, and the cross member is arranged so as to connect the pair of the side frames and the center frame.

6. A seat back frame for a vehicle for supporting a seat back, comprising:
a first back frame, at which a shoulder belt anchor for supporting one end portion of a seat belt is provided;
a second back frame arranged substantially in parallel with the first back frame;
a cross ember arranged so as to connect the first back frame and the second back frame;
one of a protruding portion or a recessed portion formed at the cross member so as to extend in a longitudinal direction thereof;
one of a complementary first recessed surface portion or a first protruding surface portion formed at the first back frame so as to be complementarily connected to the protruding portion or the recessed portion of the cross member;
one of a complementary second recessed surface portion or a second protruding surface portion formed at the second back frame so as to be connected to the protruding portion or the recessed portion of the cross member and
wherein the first back frame is a hollow column shape, the first back frame includes a first side plate portion forming one side surface of the first back frame, a first wall portion and a second wall portion, which are formed by bending end portions of the first side plate portion so as to form a recess at a rear side of a seat, so as to be positioned at the rear side and a front side of the seat, respectively, a second side plate portion, which is obtained by bending a side end portion of the first wall portion towards the rear side of the seat so as to be substantially parallel with the first side plate portion, and a third side plate portion, which is obtained by bending a side end portion of the second wall portion towards the front side of the seat so as to be substantially parallel with the first side plate portion, the third side plate portion is overlapped on the second side plate portion so as to be in contact with each other, and the second side plate portion and the third side plate portion are connected at an overlapped portion in a vicinity of a bent portion between the first wail portion and the second side plate portion.

7. The seat back frame for the vehicle according to claim 6, wherein a recessed portion is formed at the side end portion of the second side plate portion at a portion at which a curvature of the first back frame increases.

8. The seat back frame for the vehicle according to claim 7, wherein the bent portion between the first wall portion and the second side plate portion is formed so that a curvature radius at the bent portion is set to be greater than curvature radiuses of other bent portions at the first back frame.

9. The seat back frame for the vehicle according to claim 6, wherein the bent portion between the first wail portion and the second side plate portion is formed so that a curvature radius at the bent portion is set to be greater than curvature radiuses of other bent portions at the first back frame.

* * * * *